US010248968B2

(12) United States Patent
Sivaramakrishnan et al.

(10) Patent No.: US 10,248,968 B2
(45) Date of Patent: *Apr. 2, 2019

(54) SYSTEM TO DELIVER CONTENT TO INTERNET-CONNECTED DEVICES THAT HAVE SHARED A SERVER INTERNET PROTOCOL ADDRESS

(71) Applicant: Drawbridge, Inc., San Mateo, CA (US)

(72) Inventors: Kamakshi Sivaramakrishnan, Palo Alto, CA (US); Devin Guan, Monte Sereno, CA (US); Tin H. Kyaw, San Jose, CA (US); Jerry Ye, San Jose, CA (US); Ravi Menon, Austin, TX (US); Yang Yu, Redwood City, CA (US)

(73) Assignee: Drawbridge, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/992,893

(22) Filed: Jan. 11, 2016

(65) Prior Publication Data

US 2016/0125461 A1    May 5, 2016

Related U.S. Application Data

(63) Continuation of application No. 13/891,764, filed on May 10, 2013, now abandoned.

(Continued)

(51) Int. Cl.
*H04L 29/08* (2006.01)
*G06Q 30/02* (2012.01)
(Continued)

(52) U.S. Cl.
CPC ....... *G06Q 30/0255* (2013.01); *G06F 21/316* (2013.01); *G06Q 30/0241* (2013.01);
(Continued)

(58) Field of Classification Search
CPC combination set(s) only.
See application file for complete search history.

(56) References Cited

U.S. PATENT DOCUMENTS

| 5,948,061 A | 9/1999 | Merriman et al. | |
| 5,999,979 A * | 12/1999 | Vellanki | H04L 29/06 |
| | | | 348/E5.008 |

(Continued)

FOREIGN PATENT DOCUMENTS

| WO | WO-2012039766 A2 | 3/2012 |
| WO | WO-2013170198 A2 | 11/2013 |

OTHER PUBLICATIONS

He, Daqing and Goker, Ayse, "Detecting Session Boundaires from Web User Logs", 2000, pp. 1-10. (Year: 2000).*

(Continued)

*Primary Examiner* — William A Brandenburg
*Assistant Examiner* — Marie P Brady
(74) *Attorney, Agent, or Firm* — Schwegman Lundberg & Woessner, P.A.

(57) ABSTRACT

A system to pair internet-connected devices comprising: a plurality of Internet servers each configured to share its server Internet Protocol address with two or more internet-connected devices that share a connection to the Internet through the Internet server; means for producing different respective frequency counts of co-occurrences of different respective pairs of internet-connected device identities: means for producing different respective Boolean counts of Internet protocol addresses having co-occurrences of different respective pairs of internet-connected device identities; and means for determining a device pairing of first and second internet-connected devices based at least in part upon frequency counts of co-occurrences and Boolean counts of Internet protocol addresses having co-occurrences.

1 Claim, 13 Drawing Sheets

Related U.S. Application Data

(60) Provisional application No. 61/645,549, filed on May 10, 2012.

(51) Int. Cl.
| | |
|---|---|
| *H04W 4/21* | (2018.01) |
| *H04W 4/20* | (2018.01) |
| *G06F 21/31* | (2013.01) |
| *H04W 4/80* | (2018.01) |
| *H04W 4/00* | (2018.01) |

(52) U.S. Cl.
CPC ..... *G06Q 30/0269* (2013.01); *G06Q 30/0277* (2013.01); *H04L 67/02* (2013.01); *H04L 67/146* (2013.01); *H04L 67/22* (2013.01); *H04L 67/303* (2013.01); *H04W 4/206* (2013.01); *H04W 4/21* (2018.02); *G06F 2221/2117* (2013.01); *G06F 2221/2151* (2013.01); *H04W 4/008* (2013.01); *H04W 4/80* (2018.02)

(56) References Cited

U.S. PATENT DOCUMENTS

| | | | | |
|---|---|---|---|---|
| 8,131,745 | B1* | 3/2012 | Hoffman | G06Q 10/107 707/766 |
| 8,661,119 | B1* | 2/2014 | Jindal | H04L 67/02 709/224 |
| 2008/0115083 | A1* | 5/2008 | Finkelstein | G06F 17/30 715/805 |
| 2008/0243822 | A1 | 10/2008 | Campbell et al. | |
| 2009/0005987 | A1 | 1/2009 | Vengroff et al. | |
| 2010/0057762 | A1* | 3/2010 | Hatami-Hanza | G06F 17/30713 707/E17.005 |
| 2010/0192207 | A1 | 7/2010 | Raleigh | |
| 2011/0093327 | A1* | 4/2011 | Fordyce, III | G06Q 20/10 705/14.39 |
| 2011/0320450 | A1 | 12/2011 | Liu et al. | |
| 2012/0136877 | A1 | 5/2012 | Zadeh et al. | |
| 2013/0036434 | A1* | 2/2013 | Shkedi | H04N 21/4524 725/14 |
| 2013/0124309 | A1 | 5/2013 | Traasdahl et al. | |
| 2013/0124327 | A1* | 5/2013 | Doughty | G06Q 30/0269 705/14.64 |
| 2013/0226692 | A1 | 8/2013 | Kouladjie et al. | |
| 2013/0326007 | A1 | 12/2013 | Turner et al. | |
| 2014/0095320 | A1 | 4/2014 | Sivaramakrishnan et al. | |
| 2014/0120864 | A1* | 5/2014 | Manolarakis | H04W 24/08 455/405 |

OTHER PUBLICATIONS

Metwally, Ahmed and Paduano, Matt, "Estimating the Number of Users behind IP addresses for Combating Abusive Traffic", Aug. 21-24, 2011, pp. 1-9. (Year: 2011).*
"U.S. Appl. No. 13/891,764, Final Office Action dated Oct. 8, 2015", 47 pgs.
"U.S. Appl. No. 13/891,764, Final Office Action dated Oct. 27, 2015", 44 pgs.
"U.S. Appl. No. 13/891,764, Non Final Office Action dated Feb. 12, 2015", 27 pgs.
"U.S. Appl. No. 13/891,764, Response filed Jan. 5, 2015 to Restriction Requirement dated Sep. 12, 2014", 7 pgs.
"U.S. Appl. No. 13/891,764, Response filed Aug. 12, 2015 to Non Final Office Action dated Feb. 12, 2015", 48 pgs.
"U.S. Appl. No. 13/891,764, Response filed Dec. 28, 2015 to Final Office Action dated Oct. 27, 2015", 42 pgs.
"U.S. Appl. No. 13/891,764, Restriction Requirement dated Sep. 12, 2014", 5 pgs.
"European Application Serial No. 13788156.1, Amendment Filed Mar. 23, 2015", 3 pgs.
Svaramakrishnan, Kamakshi, et al., "System and Method for Determining Related Digital Identities", U.S. Appl. No. 61/645,549, filed May 10, 2012, 50 pgs.
Traasdahl, Are, et al., "System and Method for Real-Time Bidding Across Bridged Platforms", U.S. Appl. No. 61/559,579, filed Nov. 15, 2011, 7 pgs.
Traasdahl, Are, et al., "System and Method for Using Device Fingerprints to Track Users in a Privacy-Secure Manner", U.S. Appl. No. 61/563,277, filed Nov. 23, 2011, 6 pgs.
Traasdahl, Are, et al., "System and Method for Using Device Signatures to Track Users in a Privacy-Secure Manner", U.S. Appl. No. 61/563,963, filed Nov. 28, 2011, 6 pgs.
"U.S. Appl. No. 13/891,764, Advisory Action dated Jan. 21, 2016", 3 pgs.
"U.S. Appl. No. 13/891,764, Non Final Office Action dated Mar. 25, 2016", 37 pgs.
"U.S. Appl. No. 13/891,764, Preliminary Amendment filed Jan. 27, 2016", 22 pgs.
"European Application Serial No. 13788156.1, Extended European Search Report dated Mar. 29, 2016", 8 pgs.
"International Application serial No. PCT/US2013/040629, International Preliminary Report on Patentability dated Nov. 11, 2014", 6 pgs.
"International Application serial No. PCT/US2013/040629, International Search Report dated Nov. 26, 2013", 2 pgs.
"International Application serial No. PCT/US2013/040629, Written Opinion dated Nov. 26, 2013", 5 pgs.
Eirinaki, M, et al., "Web mining for Web personalization", ACM Transactions on Internet Technology, ACM, New York, NY, US, vol. 3, (Feb. 1, 2003), 1-27.
Facca, F M, et at., "Mining interesting knowledge from weblogs: a survey", Data & Knowledge Engineering, Elsevier BV, NL, vol. 53, No. 3,, (Jun. 1, 2005), 225-241.
Yinglian, Xie, et al., "De-anonymizing the internet using unreliable IDs", Computer Communication Review., vol. 39, No. 4, (Aug. 16, 2009), 75-86.
"Validation of Data for Targeting Advertising Across a Plurality of Mobile and Non-Mobile Communication Facilities Accessed by the Same User", U.S. Appl. No. 61/652,834, (Effective Date: May 29, 2012), 13 pgs.
Doughty, "Targeted Advertising Across a Plurality of Mobile and Nonmobile Communication Facilities Accessed by the Same User", U.S. Appl. No. 61/558,522, (Effective Date: Nov. 11, 2011), 24 pgs.
Doughty, "Targeted Advertising Across Web Activities on a Mobile Communication Facility and Applications Operating Thereon", U.S. Appl. No. 61/569,217, (Effective Date: Dec. 9, 2011), 14 pgs.
Doughty, "Targeted Advertising to Mobile Communication Facilities", U.S. Appl. No. 61/576,963, (Effective Date: Dec. 16, 2011), 14 pgs.

* cited by examiner

|  | Person X | Person Y | Person Z | Number of observations | Co-occurences |
|---|---|---|---|---|---|
| Home A<br>IP A | $C_X=3$<br>$D_X=4$ | $C_Y=2$<br>$D_Y=3$ | $C_Z=0$<br>$D_Z=0$ | 12 | $Co(C_X\&D_X)=3$<br>$Co(C_X\&D_Y)=3$<br>$Co(C_Y\&D_X)=2$<br>$Co(C_Y\&D_Y)=2$ |
| Home B<br>IP B | $C_X=0$<br>$D_X=0$ | $C_Y=0$<br>$D_Y=0$ | $C_Z=5$<br>$D_Z=8$ | 13 | $Co(C_Z\&D_Z)=5$ |
| Workplace<br>IP W | $C_X=10$<br>$D_X=8$ | $C_Y=0$<br>$D_Y=0$ | $C_Z=20$<br>$D_Z=10$ | 48 | $Co(C_X\&D_Z)=10$<br>$Co(C_X\&D_X)=8$<br>$Co(C_Z\&D_X)=8$<br>$Co(C_Z\&D_Z)=10$ |
| Café<br>IP C | $C_X=0$<br>$D_X=0$ | $C_Y=7$<br>$D_Y=9$ | $C_Z=4$<br>$D_Z=4$ | 24 | $Co(C_Z\&D_Y)=4$<br>$Co(C_Z\&D_Z)=4$<br>$Co(C_Y\&D_Z)=4$<br>$Co(C_Y\&D_Y)=7$ |
|  |  |  |  | 97<br>Total |  |

*FIG. 4*

|  | Person X | Person Y | Person Z | Co-occurences |
|---|---|---|---|---|
| Home A<br>IP A | $C_X=1$<br>$D_X=1$ | $C_Y=1$<br>$D_Y=1$ | $C_Z=0$<br>$D_Z=0$ | $Co(C_X \& D_X)=1$<br>$Co(C_X \& D_Y)=1$<br>$Co(C_Y \& D_X)=1$<br>$Co(C_Y \& D_Y)=1$ |
| Home B<br>IP B | $C_X=0$<br>$D_X=0$ | $C_Y=0$<br>$D_Y=0$ | $C_Z=1$<br>$D_Z=1$ | $Co(C_Z \& D_Z)=1$ |
| Workplace<br>IP W | $C_X=1$<br>$D_X=1$ | $C_Y=0$<br>$D_Y=0$ | $C_Z=1$<br>$D_Z=1$ | $Co(C_X \& D_Z)=1$<br>$Co(C_X \& D_X)=1$<br>$Co(C_Z \& D_X)=1$<br>$Co(C_Z \& D_Z)=1$ |
| Café<br>IP C | $C_X=0$<br>$D_X=0$ | $C_Y=0$<br>$D_Y=1$ | $C_Z=1$<br>$D_Z=1$ | $Co(C_Z \& D_Y)=1$<br>$Co(C_Z \& D_Z)=1$ |

*FIG. 6*

|  | Person X | Person Y | Number of observations | Co-occurences |
|---|---|---|---|---|
| ESPN.com | $C_X=5$<br>$D_X=6$ | $C_Y=0$<br>$D_Y=0$ | 11 | $Co(C_X \& D_X)=5$<br>$Co(C_X \& D_Y)=0$<br>$Co(C_Y \& D_X)=0$<br>$Co(C_Y \& D_Y)=0$ |
| CNN.com | $C_X=0$<br>$D_X=2$ | $C_Y=10$<br>$D_Y=9$ | 21 | $Co(C_X \& D_X)=0$<br>$Co(C_X \& D_Y)=0$<br>$Co(C_Y \& D_X)=2$<br>$Co(C_Y \& D_Y)=9$ |
| Finance.com | $C_X=2$<br>$D_X=0$ | $C_Y=7$<br>$D_Y=5$ | 14 | $Co(C_X \& D_X)=0$<br>$Co(C_X \& D_Y)=2$<br>$Co(C_Y \& D_X)=0$<br>$Co(C_Y \& D_Y)=5$ |
| Fark.com | $C_X=4$<br>$D_X=6$ | $C_Y=0$<br>$D_Y=0$ | 10 | $Co(C_X \& D_X)=4$<br>$Co(C_X \& D_Y)=0$<br>$Co(C_Y \& D_X)=0$<br>$Co(C_Y \& D_Y)=0$ |
|  |  |  | 56<br>Total |  |

*FIG. 8*

| | Fashion | News | Finance | Other web |
|---|---|---|---|---|
| Person X | $C_X$= 40%<br>$T_X$= 35%<br>$DI_X$= 0% | $C_X$= 20%<br>$T_X$= 25%<br>$DI_X$= 20% | $C_X$= 10%<br>$T_X$= 15%<br>$DI_X$= 10% | $C_X$= 30%<br>$T_X$= 25%<br>$DI_X$= 10% |
| Person Y | $C_Y$= 0%<br>$T_Y$= 0%<br>$DI_Y$= 0% | $C_Y$= 30%<br>$T_Y$= 25%<br>$DI_Y$= 9% | $C_Y$= 30%<br>$T_Y$= 35%<br>$DI_Y$= 5% | $C_Y$= 40%<br>$T_Y$= 40%<br>$DI_Y$= 0% |

|  | Person X | Person Y | Number of observations | Co-occurences |
|---|---|---|---|---|
| Session1 | $C_X=4$<br>$D_X=2$ | $C_Y=0$<br>$D_Y=0$ | 6 | $Co(C_X\&D_X)=2$<br>$Co(C_X\&D_Y)=0$<br>$Co(C_Y\&D_X)=0$<br>$Co(C_Y\&D_Y)=0$ |
| Session2 | $C_X=0$<br>$D_X=0$ | $C_Y=15$<br>$D_Y=12$ | 27 | $Co(C_X\&D_X)=0$<br>$Co(C_X\&D_Y)=0$<br>$Co(C_Y\&D_X)=0$<br>$Co(C_Y\&D_Y)=12$ |
| Session3 | $C_X=1$<br>$D_X=0$ | $C_Y=9$<br>$D_Y=7$ | 17 | $Co(C_X\&D_X)=0$<br>$Co(C_X\&D_Y)=1$<br>$Co(C_Y\&D_X)=0$<br>$Co(C_Y\&D_Y)=7$ |
| Session4 | $C_X=14$<br>$D_X=9$ | $C_Y=0$<br>$D_Y=1$ | 24 | $Co(C_X\&D_X)=4$<br>$Co(C_X\&D_Y)=1$<br>$Co(C_Y\&D_X)=0$<br>$Co(C_Y\&D_Y)=0$ |
|  |  |  | 74<br>Total |  |

*FIG. 10B*

SYSTEM TO DELIVER CONTENT TO INTERNET-CONNECTED DEVICES THAT HAVE SHARED A SERVER INTERNET PROTOCOL ADDRESS

RELATED APPLICATIONS

The present application is a Continuation of U.S. patent application entitled "SYSTEM AND METHOD FOR DETERMINING RELATED DIGITAL IDENTITIES" filed with the U.S. Patent Office on May 10, 2013 and having Ser. No. 13/891,764, which claims the benefit of Nonprovisional U.S. Patent Application entitled "System and Method for Determining Related Digital Identities" filed with the U.S. Patent Office on May 10, 2012 and having Ser. No. 61/645,549.

TECHNICAL FIELD

The present indention relates to the field of digital identities and digital advertising. In particular, but not by way of limitation, the present disclosure teaches techniques for determining related digital identities.

BACKGROUND

The internet has changed the mass media landscape forever. Before the internet became a mainstream mass media system, advertisers were generally limited to communicating with potential customers using television, radio, and print media (newspapers and magazines) advertising. With the popularization of the global internet, advertisers can now advertise to billions of computer users as those computer users browse the World Wide Web on the internet.

Internet advertising has become a very large industry. Two of the most commonly used advertising channels on the World Wide Web are internet search advertising and banner advertisements. Internet search advertising operates by allowing users to enter search keywords into an internet search service and then Interspersing advertisements (generally related to the search keywords) within the results of the internet search. Banner advertisements are defined areas of a web page that contain advertisements in the same manner that traditional magazines and newspapers use newsprint area for advertising. Both internet search result advertisements and internet banner-advertisements have a significant advantage over prior advertising systems since the recipient of an internet advertisement may click on the internet advertisement to obtain more information or directly proceed to an internet retailer for an immediate sale.

The internet advertising industry for advertising on personal computer systems on the internet has matured and become very sophisticated. The internet advertisers and internet advertising services use several techniques of obtaining information about internet users such that the most appropriate advertisements may be selected for each internet user. For example, Internet advertisement services may track the web browsing history from particular personal computer to determine the interests of that user and thus create a demographic profile of that internet user. Furthermore, the contents of a web page that is being delivered to personal computer may be analyzed to help select an appropriate banner advertisement that is closely related to the contents of the web page.

Although internet advertising to personal computer users that are browsing the World Wide Web has become relatively sophisticated, the overall internet advertising industry is still in its infancy. There are now many new digital electronic devices that use the internet and can be used to deliver advertising to their user. For example, cellular telephones, video game consoles, set-top video streaming boxes, internet radio devices, and tablet computer systems can all be used to deliver internet advertisements to their respective users. The techniques used to select and deliver advertisements to the users of these emerging internet platforms are relatively primitive. Thus, it would be desirable to provide tools that provide an improved ability to select appropriate internet advertisements to users of these new internet-connected digital electronic devices.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4 illustrates an example set of observation samples of the various digital identities ($C_X$, $D_X$, $C_Y$, $D_Y$, $C_Z$, $D_Z$) at four different source locations (household A, household B, workplace W, and a cyber café) depleted in FIG. 2B.

FIG. 6 illustrates the observation data from FIG. 4 but in Boolean form for use in calculating a Boolean system association score.

FIG. 8 illustrates a set of destination usage observations for four different digital devices illustrated in FIG. 2B.

FIG. 10B illustrates a set of sessions for the laptop computers $C_X$ and $C_Y$ in household A of FIG. 2B.

FIG. 11 graphically illustrates all of the observed gap times are placed into gap time buckets as illustrated in

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although some of the embodiments are mainly disclosed with reference to cellular telephones, the techniques disclosed in this document may be used with other types of digital electronic devices such as tablet computer systems and video game systems. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by references. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
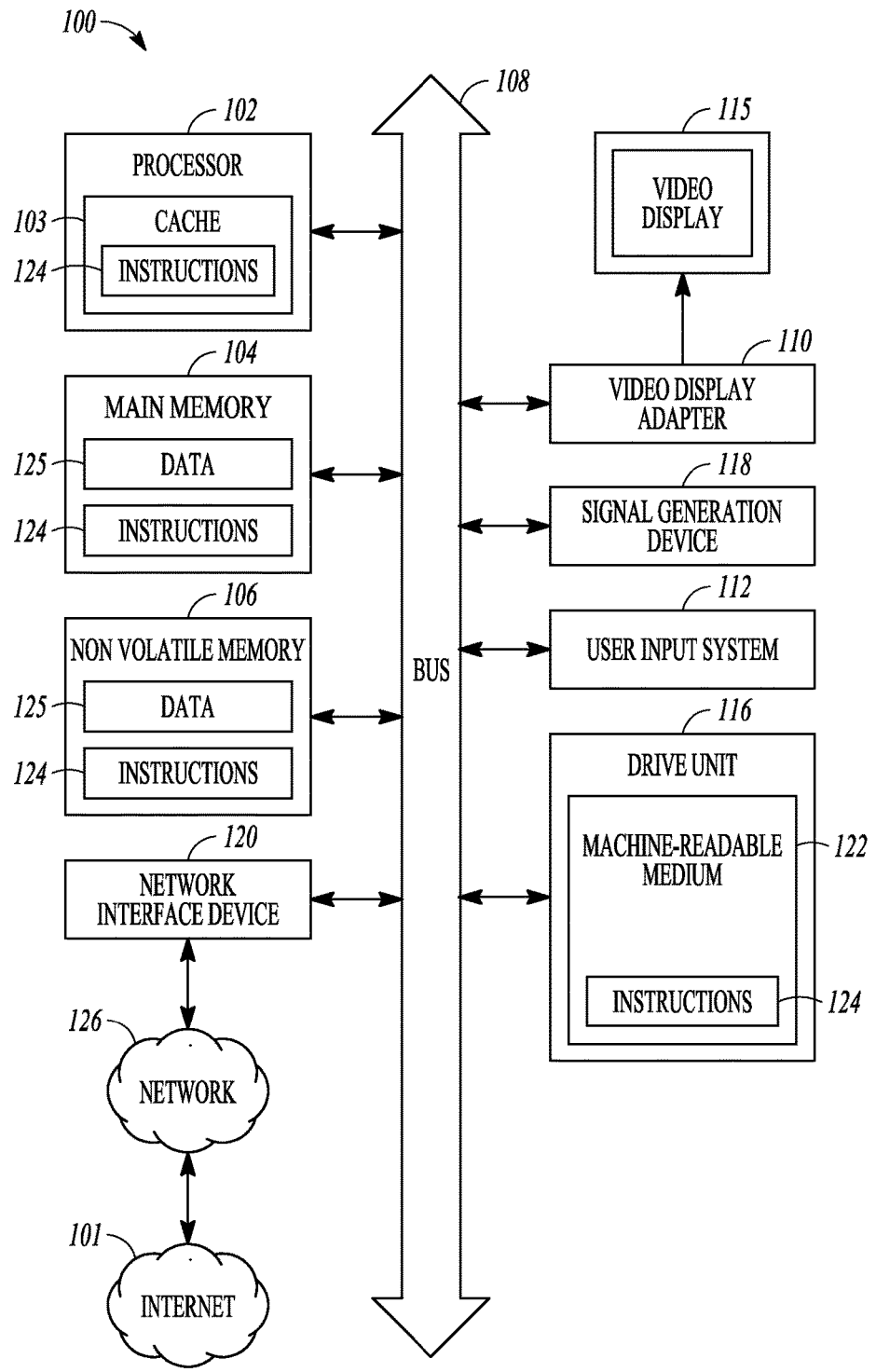
FIG. 1 illustrates a diagrammatic representation of machine in the example form of a computer system within which a set of instructions, for causing the machine to perform any one or more of the methodologies discussed herein, may be executed.

The present disclosure concerns digital computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked, deployment, the machine of FIG. 1 may operate in the capacity of a server machine or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, a network switch, a network bridge, a video game console, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both), a main memory 104, and a non volatile memory 106, which communicate with each other via a bus 108. The non volatile memory 106 may comprise flash memory and may be used either as computer system memory, as a file storage unit, or both. Both the main memory 104 and a non volatile memory 106 may store instructions 124 and data 125 that are processed by the processor 102.

The computer system 100 may include a video display adapter 110 that drives a video display system 115 such as a Liquid Crystal Display (LCD) in order to display visual output to a user. The computer system 100 may also include other output systems such as signal generation device 118 that drives an audio speaker.

Computer system 100 includes a user input system 112 for accepting input from a human user. The user input system 112 may include an alphanumeric input device such as a keyboard, a cursor control device (e.g., a mouse or trackball), touch sensitive pad (that may be overlaid on top of video display 115), a microphone, or any other device for accepting input from a human user.

The computer system 100 may include a disk drive unit 116 for storing data. The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within a cache memory 103 associated with the processor 102. The main memory 104 and the non-volatile memory 106 associated with, the processor 102 also constitute machine-readable media. The non-volatile memory 106 may comprise a removable flash memory device.

The computer system 100 may include one more network interface devices 120 for transmitting and receiving data on one or more networks 126. For example wired or wireless network interfaces 120 may couple to a local area network 126. Similarly, a cellular telephone network interface 120 may be used to couple to a cellular telephone network 126. The various different networks 126 are often coupled directly or indirectly to the global internet 101. The instructions 124 and data 125 used by computer system 100 may be transmitted or received over network 126 via the network interface device 120. Such transmissions may occur utilizing any one of a number of well-known transfer protocols such as the well known File Transport Protocol (FTP).

Note that not all of the parts illustrated within FIG. 1 will be present in all embodiments. For example, a computer server system may not have a video display adapter 110 or video display system 115 if that server is controlled through the network interface device 120. Similarly, a tablet computer or cellular telephone will generally not have a disk drive unit 116 and instead use flash memory or another form of long-term storage.

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of infractions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, battery-backed RAM, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Internet Advertising

The global internet has become a mass medium that connects publishers of information with consumers of information. Some of the publishing on the internet is done on a subscription or paid-for basis wherein a consumer pays for access to specific information. For example, a news publisher may create news web site that provides specific premium content only to customers that pay a subscription fee. However, a very large portion of the informational content available on the global internet is freely available. Web site content, videos, podcasts, and games are all freely available on the internet. To fund much of the freely available content on the global internet, internet publishers rely on advertisers that pay to have their advertisements displayed alongside and embedded within an internet publisher's content.

Figure 2A:
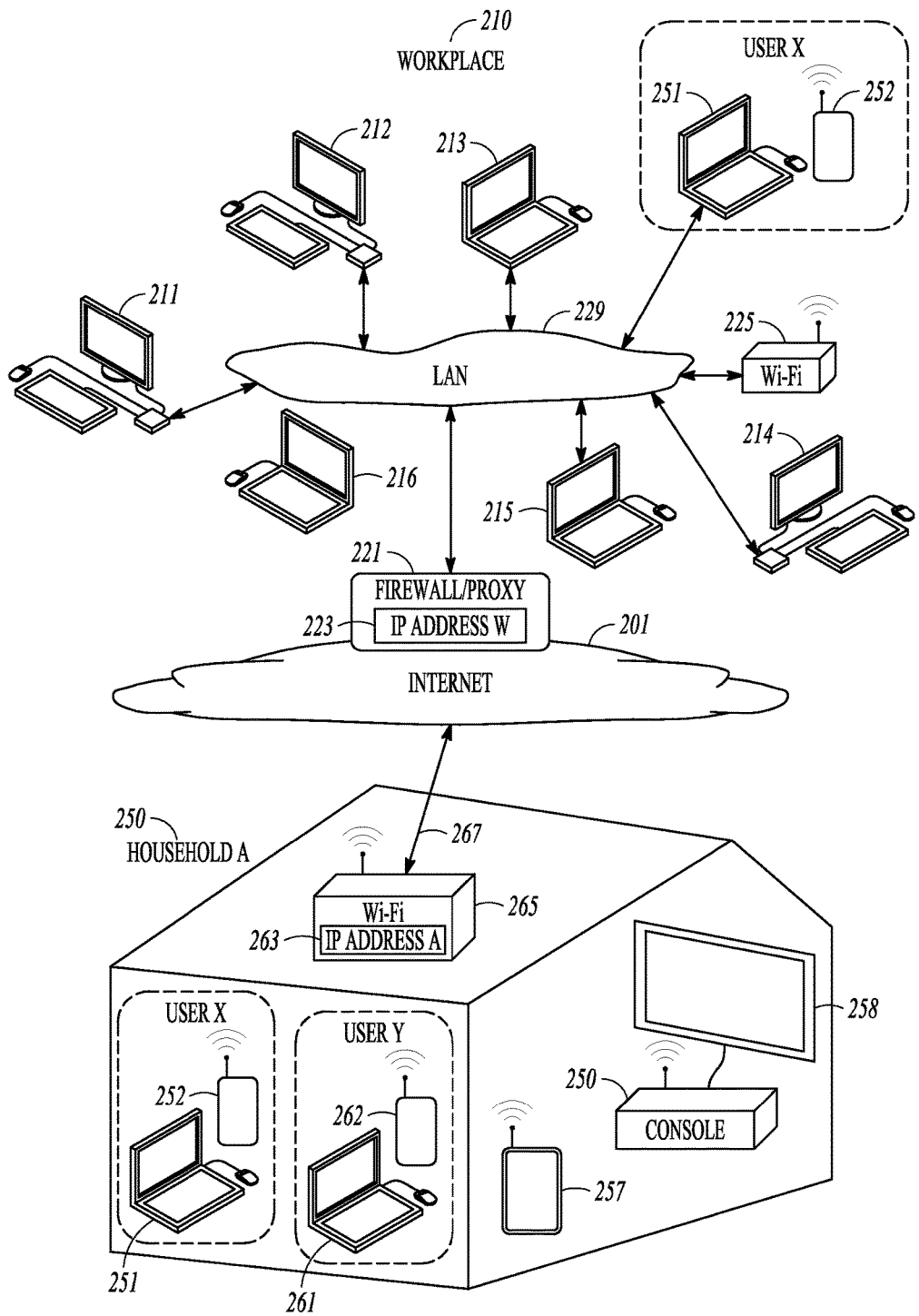
FIG. 2A conceptually illustrates a household with several digital devices that access the internet which are potential digital identity pairs.

Although internet advertising started with advertisements to personal computer users browsing the World Wide Web with web browser programs, the internet advertising market has grown significantly beyond that early stage. FIG. 2A conceptually illustrates a household A 250 that is coupled to the global internet 201 through an internet connection 267. Household A 250 uses a wireless network access point 265 to provide internet access to many different digital electronic devices within household A 250. An internet user may use a laptop computer 251 or 261 for traditional personal computer based browsing of internet web sites that are supported by internet advertising. However, all of the other internet-connected devices in household A 250 may also be used to display internet advertisements. Cellular telephones 252 and 262 may display banner advertisements in web pages displayed by a micro browser or within advertisement-supported application programs such as games downloaded onto the cellular phones. Tablet computer system 257 may also display internet advertisements in a web browser or in other application programs that are supported by advertising. A video game console 259 may display advertisements within a navigator application or even within the video games that users play on the video game console 259.

Thus, as illustrated in FIG. 2A, many different digital electronic devices within household A 250 may be served advertisements from internet advertisers. In the future, many new internet-connected digital devices will be introduced and each new internet-connected digital device may be used to display internet advertisements to its user. Note that all of the internet-connected digital devices within household A 250 will generally share a single internet Protocol (IP) address 263 that is assigned, to the Wi-Fi router device 265 that couples household A 250 to the global internet 201.

In order to really provide substantial value to internet advertisers, internet advertising must be well targeted. Advertising suntan lotion during the winter to a person living in Minnesota does not provide much value to the suntan lotion manufacturer. Thus, internet advertising services attempt to learn as much as possible about their audience in order to select the most appropriate internet advertisements. As set forth in the background, internet web site publishers that advertise to users running web browsers on personal computers have developed many different techniques for learning about their users. These techniques may include:

Generating user profiles based on web browsing histories

Using search terms entered in to search engines to target advertisements

Using the content of web pages to select matching advertisements

Creating user registration systems where users divulge demographic data

Using information on the PC to help select advertisements

However, these advertising targeting techniques developed for personal computer based internet advertising often cannot be used with other internet-connected digital devices. For example, there may be no web browsing history on the video game console 259 of household A 250. Even though the cellular telephones 252 and 262 and the tablet computer system 257 may have web browsing histories to draw from, the users may only rarely use those devices for web browsing such that their very limited browsing history does not provide an accurate demographic profile of the user to guide advertisement selection. It is therefore often much more difficult to provide well-targeted advertising to internet-connected digital devices other than personal computer systems.

Digital Identify Pairing Overview

Referring to FIG. 2A, the people that live at household A 250 use several mobile internet-connected digital devices to communicate with the internet 201. Specifically, the laptop computer systems (251 and 261), the cellular phones (252 and 262), and the tablet computer system 257 are all mobile internet-connected digital devices. These mobile devices can be and often are taken with the user to other locations that provide wireless (or wired) internet access. For example, user X in the household may use laptop computer system 251 and cellular phone 252 both at household 250 and at a workplace W 210.

When user X brings laptop computer system 251 and cellular phone 252 to workplace W 210 those two devices obviously can no longer use Wi-Fi router 265 to access the internet 201. Instead, user X connects laptop computer system 251 to the local area network 229 at work and configures cellular phone 252 to use a local Wi-Fi network provided by wireless access point 225. With these two internal connections, user X will then be able to access the internet 201 using laptop computer system 251 and cellular phone 252 through the firewall/proxy server 221 at the workplace 210.

When user X is at home A 250, the laptop computer system 251 and the cellular phone 252 will both use a single IP address A 263 that is on Wi-Fi router 265. Similarly, when that same user X is at workplace 210, laptop computer system 251 and cellular phone 252 will both use the single IP address W 223 that is on firewall/proxy server 221. Given that specific internet usage pattern data, an astute observer that knows nothing about user X could make the rational inference that laptop computer system 251 and cellular phone 252 are very likely used by the same person since laptop computer system 251 and cellular phone 252 are used together at both household 250 and at workplace 210. After having made such an inference, an advertiser may link together a digital identifier associated with laptop computer system 251 and a digital identifier associated with cellular phone 252 for advertising purposes. Such a pairing of distinct digital identities to a single user is referred to as digital identity pairing.

Assuming that a digital identity pairing has been performed accurately (the two paired digital devices are actually used by the same person) then this digital identity pairing may be used to greatly improve the targeting of internet advertising to both of the linked platforms. For example, if an advertising service correctly deduces that laptop computer system 251 and cellular phone 252 are used by the same person then the advertiser can advertise cellular telephone accessories for the specific brand of cellular phone 252 when that person uses their laptop computer system 251 to browse the World Wide Web. More importantly, when that person (user X) uses an advertising supported application on cellular phone 252, advertisers can leverage the longer and more detailed user profile data that has been collected from laptop computer system 251 to accurately select targeted advertisements for display on that cellular phone 252. Thus, digital identity pairing can greatly improve the quality of internet advertising on digital devices that have been correctly identified as belonging to the same user.

Digital Identity Pairing Basics

Referring to FIG. 2A, there many different internet-connected devices (251, 252, 261, 262, 257, and 259) at household A 250 that may access the internet 201. All of these internet-connected devices at household A 250 will use the same IP address A 263 that is on Wi-Fi router 265. Similarly, when the user of laptop computer system 251 and cellular phone 252 is at workplace 210 those two devices will have the same IP address W 223 as all of the other internet connected devices (211, 212, 213, 214, 215, and 225) that share the connection to the interact 201 through firewall/proxy device 221. Therefore, the task of specifically identifying laptop computer system 251 and cellular phone 252 as a pair of related digital devices used by the same human user is a difficult task. To make the association, sophisticated analysis is performed on the server logs of internet web site servers and internet advertisement servers that collect information on every internet-connected device that makes any type of request to the server.

Figure 3:
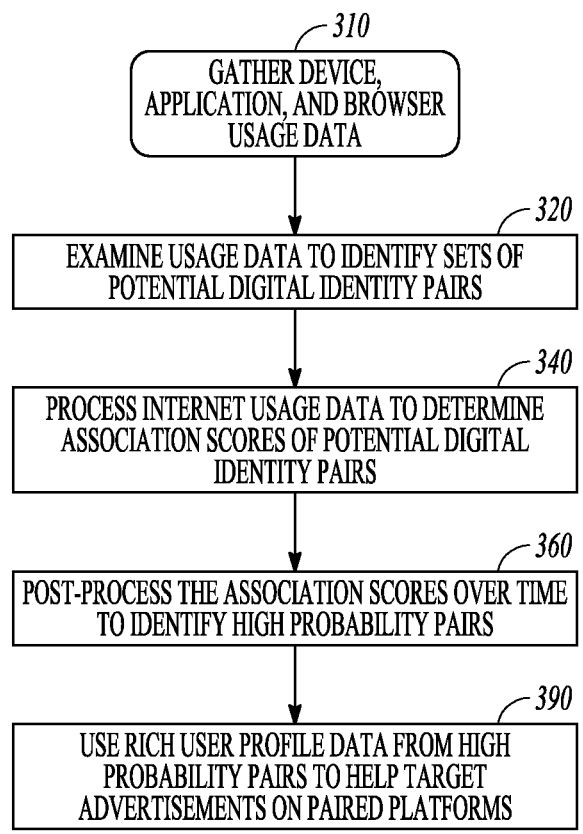
FIG. 3 illustrates a high-level flow diagram that describes one embodiment of a digital identity pairing system.

FIG. 3 illustrates a high-level flow diagram that describes how a digital identity pairing system may operate in one embodiment. Initially, at stage 310, internet usage data is collected for many different digital identities. In one embodiment, the basic internet usage data that is collected for analysis are data triads consisting of a client identifier, a common source/destination identifier, and a timestamp. Each part of the data triad will be individually described.

The client identifier is used to identify a specific client device, a client program, a user identity, or any other type of digital identity. Examples of client identifiers include web browser cookies, cellular telephone device identifiers, MAC addresses, userids, and any other similar identifier that is linked to a specific client device, client program, or user. The teachings of the present disclosure may be used with a wide variety of different client identifiers. In example digital identity pairings that will be disclosed with reference to FIGS. 2A and 2B, web browser cookies on laptop computer systems and device indentifiers on cellular phone devices are used as client identifiers. However, the disclosed techniques may be used with any other suitable client identifiers that can be used to identify specific client devices, web browsers, users, or other digital identities.

The common source/destination identifier is the identity of some source or destination that client devices (as identified by their client identifiers) will likely have in common if the two client devices are related. In the situation depicted in FIG. 2A, the Internet Protocol (IP) addresses are the common source/destination identifier that may be used to link related client devices. Specifically, the digital identity pairing system may use the fact that laptop computer system 251 and cellular phone 252 both share the IP address W 223 when at work and the IP address A 263 when at home to deduce that laptop computer system 251 and cellular phone 252 are related client devices.

The timestamps in each data triad may be used to ensure that the data used is relevant. The ownership of internet connected devices may change over time such that very old internet usage data should not be used. Furthermore, many Internet Protocol addresses are "dynamic addresses" that may be used by different entities at different times. Thus, internet usage data observations should have relatively close temporal relations in order to provide accurate digital identity pairing results. In addition to ensuring that internet usage observations are temporally proximate, certain embodiments of the disclosed system use the timestamps of internet usage data triads in a more sophisticated manner as will be disclosed in a later section of this document.

The triads of internet usage data (client identifier, common source/destination identifier, and timestamp) may be collected by internet servers that track each internet server request received. In particular, internet advertisement services and internet web publishers that track each advertisement or web page served are excellent sources of internet usage data information. Individual application programs (such as games, media aggregators, utilities, etc.) that run on client devices and report usage information to servers on the internet are also excellent sources of usage data.

Referring back to FIG. 3, after collecting internet usage data the next step in digital identity pairing is to determine a set of potential digital identity pairs. There are many millions of different digital identities involved in internet activities every day. Attempting to analyze every possible permutation of digital identities as a potential digital identity pair would be an extremely difficult and probably futile task. Thus, to reduce the size of the digital identity pairing problem, the gathered internet usage data is analyzed at stage 320 to identify a much smaller number of potential digital identity pairs that have a decent probability of being related.

In embodiments that use IP addresses as common source/destination identifiers, two different techniques have been used to select potential digital identity pairs for further analysis. A first strategy is to examine the number of different digital identities known to use the same IP address. Specifically, if less than a threshold number of digital identities are known to use a specific IP address then all of the different logical pairings of digital identities from that single IP address may be viewed as potential digital identity pairs. The reasoning is that if there are just a few different digital identities related to a single common IP then there is a good probability that some of those different digital identities are associated with the same person and that one may be able to statistically link the digital identities belonging to that same person. For example, a family household that shares a single internet account will likely have family members that use more than one digital identity that can be statistically linked.

In one embodiment the threshold value is set to six such that if there are six or less digital identities seen at a particular IP address then various logical combinations of those six or less digital identities may be considered potential digital identity pairs. For example, in FIG. 2A household A 250 has only six different digital devices (251, 252, 261, 262, 257, and 259) that couple to the internet 201 though a single IP address A 263 on Wi-Fi router 265 such that the various digital devices in household A 250 may be considered as potential digital identity pairs. In contrast, a very large number of digital devices couple to the internet 201 though the single IP address W 223 at workplace W 210 such that the digital identity pairing system does not immediately consider all of the combinations of digital devices at workplace 219 as potential digital identity pairs. In effect, the system identifies family households (which often have less than six internet connected devices) and then attempts to pair up digital devices from the family household that are used by the same user.

In another embodiment, the digital identity pairing system considers the specific IP address origin and determines if that IP address is an address where paired digital identities are likely to be found (such as household residences as set forth above). All of the static IP addresses on the internet are allocated by the internet Corporation for Assigned Names and Numbers (ICANN). By examining who owns a particular IP address, one may make a determination as to whether it will be easy to identify related digital identities may be located at that IP address. Thus, for example, IP addresses that are used by an internet service provider (ISP) to provide residential internet service may be good IP addresses to use when identifying potential digital identity pairs. Various other systems of identifying residential household IP addresses may also be used. In addition, other techniques of identifying likely digital identity pairs may also be used in step 330 in addition to or instead of the systems for identifying residential households.

After selecting sets of potential digital identity palm at stage 330, the digital identity pairing system then processes the gathered internet usage data at stage 340 to determine association scores for the potential digital identity pairings. Those digital identity pairings with the most favorable association scores will be deemed most likely to be associated with the same human user. Many different techniques may be used to calculate association scores for the potential digital identity pairings. A detailed explanation of one particular method of calculating association scores (and other related metrics that may also be used) is presented in a later section of this document but various other different scoring systems may be used.

Since the observed internet usage data will vary over time and certain chance activities may cause false digital identity associations to be detected, thee association scores may be post-processed to remove noise. For example, association scores may be smoothed out over time using various techniques. Thus, at stage 360, the association score data that has been generated over time may be post-processed such that outlier data points are largely filtered out. The end result of stage 360 is a set of high probability digital identity pairings.

Finally, at stage 390, the identified high probability digital identity pairs are used to improve the targeting of internet advertising to both of the paired digital identities. The accumulated profile data from the two separate digital identities may be combined in a synergistic manner to provide a detailed profile of the human user associated with the paired digital identities. This detailed profile may then be used to select the best internet advertisements for that human user when either of the digital identities requires an internet advertisement.

A Basic Digital Identity Pairing Method

As set forth in the flow diagram of FIG. 3, one embodiment of the digital identity pairing system first identifies pairs of digital identities that have a good probability of being a related pair (in stage 330) and then processes the collected internet usage data for those two digital identities to generate an 'association score' for the potential pair (in stage 340). The calculated association score may be used to determine if the two digital identities are deemed to be associated with the same human user. To describe how association scores are calculated in one specific embodiment, a detailed example is hereby set forth with reference to FIG. 2B and FIG. 4.

Figure 2B:
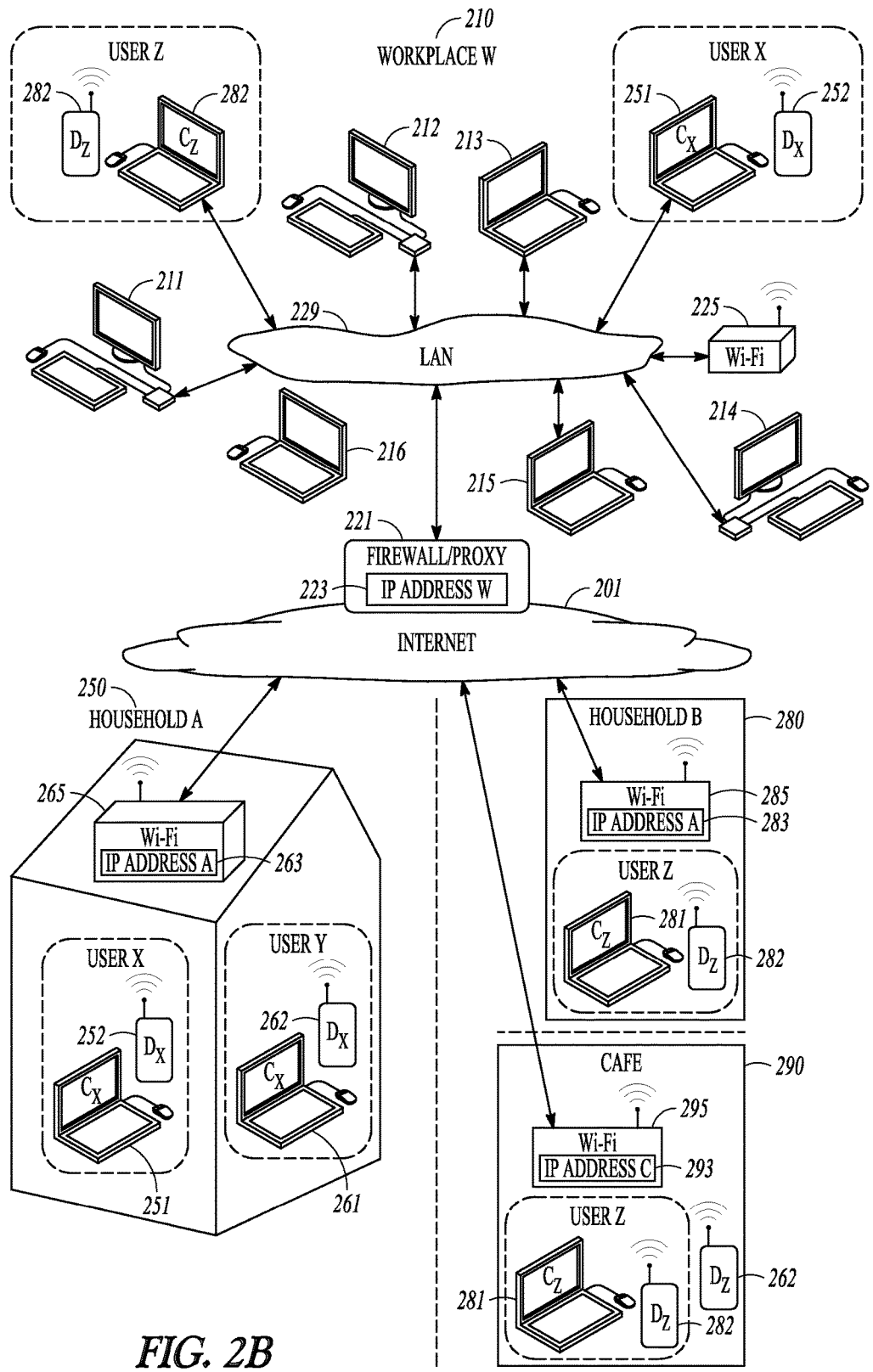
FIG. 2B conceptually illustrates the digital devices of three different people used at four different locations: household A, household B, a workplace W, and a cyber café.

FIG. 2B illustrates the household A 250 and the workplace W 210 of FIG. 2A with an additional household B 280 and a cyber café C 290. In household A 250 there are two digital device users: User X and User Y. User X regular uses laptop computer system 251 and cellular phone 252 such that the digital identities of laptop computer system 251 and cellular phone 252 should be identified as paired digital identities. User X's laptop computer system 251 is digitally identified using a cookie (C) on a web browser such that it is labelled $C_X$ and user X's cellular phone 252 is digitally identified with a deviceID (D) such that it is labelled $D_X$. This digital device labelling nomenclature will be used with the other laptop and cellular phones as well. User Y of household A 250 regularly uses laptop computer system $C_Y$ 261 and cellular phone $D_Y$ 262 such that $C_Y$ 261 and $D_Y$ 262 should also be identified as a related pair of digital identities. Recall that all of the digital devices ($C_X$ 251, $D_X$ 252, $C_Y$ 261, and $D_Y$ 262) in household A 250 will use the same IP address A 263 that is assigned to Wi-Fi router 265 when those digital devices are used at household A 250. Note that although this embodiment is based open using web browser cookies arid mobile device identifiers, any other similar identifiers that can be associated with the digital devices may be used.

User Z resides at household B 280 regularly uses laptop computer system $C_Z$ 281 and cellular phone $D_Z$ 282. While at household B 280, both $C_Z$ 281 and $D_Z$ 282 will use IP address B 283 that is assigned to Wi-Fi router 285 in use at household B 280. Both user X and user Z work together at workplace W 210 such that $C_X$ 251, $D_X$ 252, $C_Z$ 281, and $D_Z$ 282 are regularly used at workplace W 210. While at workplace W 210 those digital devices will all use IP address W 223 that is assigned to firewall/proxy 221 at workplace W 210. Many other digital devices (211, 212, 213, 214, 215, and 216) will also use IP address W 223 at workplace W 210.

Finally, FIG. 2B also illustrates a cyber café 290 that offers free Wi-Fi service to customers of cyber café 290. User Z and user Y frequent cyber café C 290 such that $C_Z$ 281, $D_Z$ 282, and $D_Y$ 262 are illustrated at cyber café 290 where IP address C 293 is used on Wi-Fi router 295. Note that many other visitors (not shown) will also frequent cyber café 290. However, the various digital devices only seen together at cyber café 290 will not be considered potential digital identity pairs since there are too many digital identity pairings seen together at cyber café 290.

After collecting internet usage data (as set forth in stage 310), the next step in identifying digital identity pairs is to select a set of potential digital identity pairs as set forth in stage 320 of FIG. 3. As set forth in the previous section, the various combinations of digital identities that are associated with IP addresses having six or less digital identities may be selected as potential digital identity pairings. In the example of FIG. 2B, the various combinations of the digital devices at households A 250 and B 280 are therefore considered potential digital identity pairs, (The workplace W 210 and cyber café C 290 have too many different digital identities associated with them and thus do not provide good candidates for digital identity pairs.) For simplicity, only the possible digital identity pairings ($C_X$, $D_X$), ($C_X$, $D_Y$), ($C_Y$, $D_X$) and ($C_Y$, $D_Y$) from household A 210 will be analyzed in this example.

After identifying a set of potential digital identity pairs, the digital identity pairing system then calculates association scores for all of the potential digital identity pairs as set forth in stage 340 of FIG. 3. In one embodiment, the pairing system attempts to pair each digital device with only one web browser cookie. (However, more than one different digital device may be paired with the same browser cookie.) Thus, among two competing cookies attempting to be paired with the same digital device, the digital identity pairing with the higher association score may be selected. For example, between potential pairings ($C_X$, $D_X$) and ($C_Y$, $D_X$), the pair with the higher association score may be selected as the most likely digital identity pair. Similarly, between potential digital identity pairings ($C_X$, $D_Y$) and ($C_Y$, $D_Y$) the pair with the higher association score may be selected.

In one particular embodiment, the digital identity pairing system uses a variation of Bayesian probability analysis to calculate an association score for each of the potential cookie and deviceID digital identity pairs. In addition a "support" score and "confidence" score may also be calculated. The support, confidence, and association scores may be defined as follows:

$$Support = P(cookie, deviceID)$$

$$Confidence = P(cookie|deviceID)$$

$$Association(cookie \rightarrow deviceID) = P(cookie|deviceID)/P(cookie)$$

These three scores may be used to Identify digital identity pairings and to rate the confidence in a digital identity pairing that has been made. The support score gives an indication of how much data support there is for the analysis of this particular cookie and deviceID pair. The confidence score gives an indication of how much confidence there is in the association score. The association score provide rating of how closely the cookie and deviceID are associated.

In the present disclosure, the support, confidence, and association scores are calculated using the set of internet usage observations on the various digital identities being considered that were collected in stage 310 of FIG. 3. The following equations describe how the internet usage observations may be used to calculate the support, confidence, and association scores.

co-occurrences(cookie, deviceID)=number of times both cookie and deviceID at the same location (same source identifier IP address).

P(cookie, deviceID)co-occurrences(cookie, deviceID)/total sample size $P$(cookie|deviceID)=co-occurrences(cookie, deviceID)/occurrences(deviceID)

$P$(cookie)=number of occurrence (cookie)/total sample size

To best illustrate the manner in which support, confidence, and association scores may be calculated in one embodiment, the association scores for some potential digital identity pairings in FIG. 2B will be calculated using a set of digital identity internet usage observations depicted in FIG. 4. The internet usage observation samples of FIG. 4 are a set of observations of the various digital identities ($C_X$, $D_X$, $C_Y$, $D_Y$, $C_Z$, $D_Z$) at various different source locations (household A, household B, workplace W, and the cyber café C) that are all within a specified time window to keep the data fresh. These internet usage observations come from collected internet usage data triads (client identifier, common source/destination identifier, and timestamp) wherein the client identifiers are the PC browser cookies and cellular phone deviceIDs, the common source/destination identifiers are the IP address of the location where a client identifier was observed, and the timestamps are all within a defined window.

To illustrate how the digital identity pairing system works, an example is hereby presented wherein the digital identity pairing system attempts to pair cellular phone $D_X$ 252 from household A 250 with one of the laptop computers $C_X$ 251 or $C_Y$ 261 used at household A 250. To calculate an association score for $D_X$ and $C_Y$ the following information from the table in FIG. 4 is needed:

1) $C_Y$ was observed 2 times at home A
2) $D_X$ was observed 4 times at home A and 8 times at workplace W
3) $C_Y$ and $D_X$ co-occurred 2 times at home A
4) There are 90 total observations The above observations are then used to calculate Association($C_Y \rightarrow D_X$) as follows:

$$P(C_Y) = \text{\# of occurrence } (C_Y)/\text{total sample size} = (2+7)/97 = 11/97$$

$$P(C_Y|D_X) = \text{co-occurrences}(C_Y, D_X)/\text{occurrences}(D_X) = 2/(4+8) = 1/6$$

$$Association(C_Y \rightarrow D_X) = P(C_Y|D_X)/P(C_Y) = (1/6)/(11/97) = 1.47$$

The other potential pairing for cellular phone $D_X$ 252 is the pairing of cellular phone $D_X$ 252 with laptop computers $C_X$ 251. To calculate an association score for the pair of $C_X$ and $D_X$ the following information from the table in FIG. 4 is needed:

1) $C_X$ was observed 3 times at home A and 10 times at workplace W
2) $D_X$ was observed 4 times at home A and 8 times at workplace W
3) $C_X$ and $D_X$ co-occurred 3 times at home A and 8 times at workplace W
4) There are 97 total observations The above observations are then used to calculate Association($C_X \rightarrow D_X$) as follows:

$$P(C_X) = \text{\# of occurrence } (C_X)/\text{total sample size} = (3+10)/90 = 13/97$$

$$P(C_X|D_X) = \text{co-occurrences}(C_X, D_X)/\text{occurrences}(D_X) = (3+8)/(4+8) = 11/12$$

$$Association(C_X \rightarrow D_X) = P(C_X|D_X)/P(C_X) = (11/12)/(13/97) = 6.34$$

When comparing the two association scores, the higher association score is selected. In this case, the Association ($C_X \rightarrow D_X$)=6.34 score is much higher than the Association ($C_Y \rightarrow D_X$)=1.47 score such that the pairing of laptop computer system $C_X$ 251 and cellular phone $D_X$ 252 are deemed to be a high-probability digital ideality pair. The support and confidence scores for this pairing are as follows:

$$Support = P(C_X, D_X) = \text{co-occurrences}(C_X, D_X)/\text{total sample size}$$

$$Support = (3+8)/97 = 11/97$$

$$Confidence = P(C_X|D_X) = \text{co-occurrences}(C_X, D_X)/\text{occurrences}(D_X)$$

$$Confidence = (3+8)/(4+8) = 11/12$$

The Support metric may be used to filter out observations that do not have enough statistical significance. In one embodiment the minimum Support metric is calibrated based on a desired Precision/Recall measurement score. The Confidence metric is a value calculated as part of the Association score.

In household B 280, the only possible digital identity pairing is of laptop computer system $C_Z$ 281 and cellular phone $D_Z$ 282. To calculate an association score for $C_Z$ and $D_Z$ the following information from the table in FIG. 4 is needed:

1) $C_Z$ observations: 5 at home B, 20 at workplace W, and 4 at café C.
2) $D_Z$ observations: 8 at home B, 10 at workplace W, and 4 at café C.
3) $C_Z$ & $D_Z$ co-occurrence: 5 at home B, 10 at workplace W, and 4 at café.
4) There are 97 total observations The above observations are then used to calculate Association($C_Z \rightarrow D_Z$) as follows:

$$P(C_Z) =$$
$$\text{\# of occurrence } (C_X)/\text{total sample size} = (5 + 20 + 4)/97 = 29/97$$
$$P(C_Z \mid D_Z) = \text{co-occurrences}(C_Z, D_Z)/\text{occurrences}(D_Z)$$
$$= (5 + 10 + 4)/(8 + 10 + 4) = 19/22$$
$$\text{Association}(C_Z \rightarrow D_Z) = P(C_Z \mid D_Z)/P(C_Z) = (19/22)/(29/97) = 2.89$$
$$\text{Support} = P(C_Z, D_Z) = \text{co-occurrences}(C_Z, D_Z)/\text{total sample size}$$
$$\text{Support} = (5 + 10 + 4)/97 = 19/97$$
$$\text{Confidence} =$$
$$P(C_Z \mid D_Z) = \text{co-occurrences}(C_Z, D_Z)/\text{occurrences}(D_Z)$$
$$\text{Confidence} = (5 + 10 + 4)/(8 + 10 + 4) = 19/22$$

Since $C_Z$ and $D_Z$ is the only possible digital identity pairing of digital identities at household B 280 there are no other association scores to directly compare it against. Thus, some threshold value may be used to determine whether that association score is large enough to determine that the two devices should be paired. The 19/97 support score and 19/22 confidence score may also be used to help determine if $C_Z$ and $D_Z$ will be considered as a digital identity pair.

Post-Processing Association Scores

The association scores calculated for a potential digital identity pair will vary over time depending on the specific digital identity usage observations that are being used. To eliminate this 'noise' in the data, various techniques may be used to smooth out the data and provide more consistent results. Thus, as set forth in stage 360 of FIG. 3, a digital identity pairing system may post-process association scores to improve the overall accuracy of the system.

One simple means of post-processing association scores to improve the results is to discard association scores that fall below a particular designated threshold level. Association scores that fall below a designated threshold level may simply be irrelevant noise.

Figure 5A:
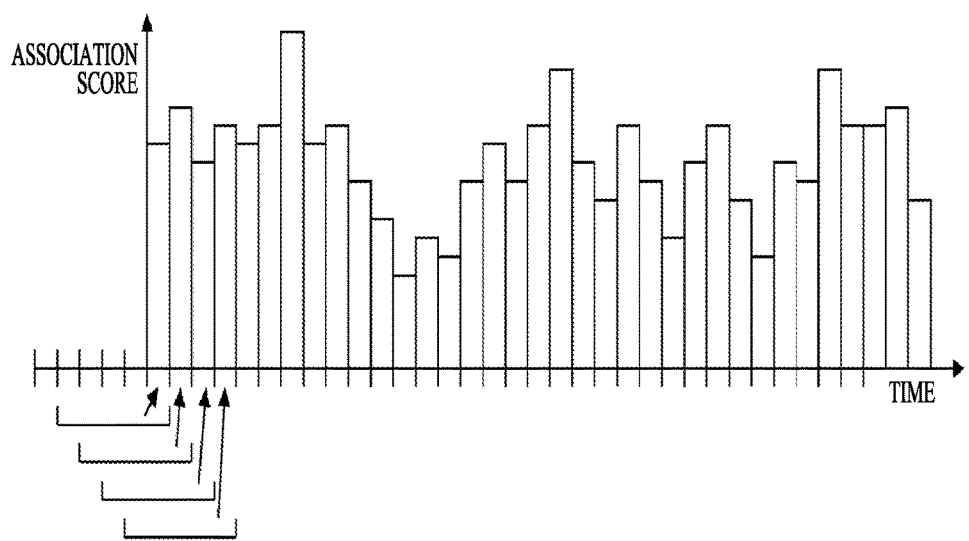
FIG. 5A graphically illustrates an example of a series of daily association scores for a particular potential digital identity pair calculated over time.

FIG. 5A graphically illustrates an example of a series of daily association scores for a particular potential digital identity pair calculated over time. Each association score is actually calculated using a moving window of recent digital identity usage observations as conceptually illustrated in the lower left of the graph. In the example of FIG. 5A, each association score is calculated using digital identity usage observations from the last five days. Using a moving window filters out some of variability in the data but the data is still somewhat variable as illustrated in FIG. 5A. Note that a five-day moving window is just an arbitrary selection and the digital identity pairing system may user other time scales. Selection of the data window size will be made by measuring the precision and recall of different sizes and selecting the window size that provides the best result.

To further reduce the noise in the association score data, a digital identity pairing system may post-process association scores to eliminate some of the outlying data samples. For example, if a person goes on a vacation then that person's digital device usage pattern may vary dramatically and thus eliminate a digital identity pair that was discovered. Proper post-processing of the association scores may prevent a temporary change in usage patterns from eliminating an accurately made digital identity pairing.

In one embodiment, the digital identity pairing system collects a number of association scores and calculates a statistical mode of the association scores that have been gathered over time. The statistical modes of different association scores are then compared against each other to determine the high-probability pairs (instead of comparing recently calculated association scores directly). Using statistical modes may effectively reduce the noise in the sampled digital identity usage data.

Figure 5B:
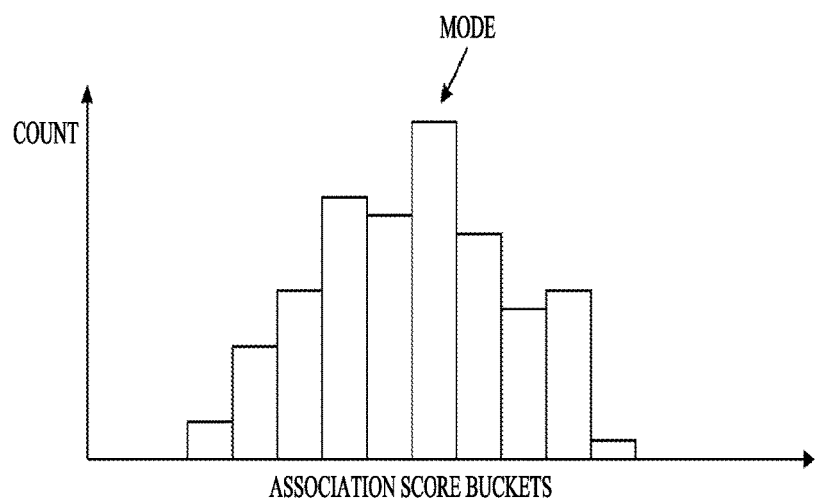
FIG. 5B graphically illustrates the daily association scores of FIG. 5A collected in a set of association score range buckets to identify a statistical mode.

One method of calculating a statistical mode involves first creating a set of different association score range buckets. The width of the association score range buckets will vary depending on the data density. Then, the collected set of association scores (such as the scores from FIG. 5A) are divided into the various association scores buckets thereby creating a count of the number of association scores that fall within each association score range bucket. An example of this is conceptually illustrated in FIG. 5B. The association score range bucket with the greatest number of association scores in that bucket is deemed to be the statistical mode in one embodiment and may be used to compare against other association score statistical modes calculated in the same manner.

Various other post-processing methods may also be used to smooth out the association scores. For example, instead of using a statistical mode, other implementations may use a median, a mean, or another method of smoothing out the association scores.

Boolean Association Score System

As set forth in the previous sections, one embodiment of digital identity pairing system operates by counting the frequency of observations of a digital identity (such as a cookie or a device identifier) at a particular source/destination address (such as an IP address). The internet usage frequency are then used to identify a set of potential digital identity pairs that are then processed to determine a set of association scores for each of the potential digital identity pairs.

The internet usage frequency data can be heavily biased by the number of times that a digital identity is linked to a particular source/destination identifier. For example, a user that spends a very large amount of time using a laptop computer system at work but only rarely uses that laptop computer system while at home will have results that are heavily biased by the large number of data samples collected from the user's work location. To reduce this heavy biasing that may occur; some embodiments employ a Boolean based association score system that does not operate by counting the number of times (frequency) a digital identity is observed at a source/destination in a specified time period.

Instead, the Boolean association score system only counts whether a particular digital identity was observed or not at a source/destination identifier during the relevant time period.

FIG. 6 illustrates the observed usage data from FIG. 4 but in Boolean form instead of frequency count form. Thus, if a particular digital identity was observed at a particular location during a specified time period then a '1' is assigned and when there is no observation a "0" is assigned. Once the digital identity observation data has been converted to Boolean form, the Boolean observation data can be processed into Boolean-based association scores using slightly modified techniques. One important difference is that instead of using the total number of observations as a sample size, the number of possible source/destination location identifiers is considered as the sample size. Therefore, the following equation has changed:

$P(\text{cookie}) = \text{number of occurrences(cookie)/possible locations}$

To fully explain the Boolean association score calculation methodology, as example is presented with reference to the Boolean usage data disclosed in FIG. 6. Specifically, to calculate a Boolean system association score of $C_X$ and $D_Y$ the following information from the table in FIG. 6 is used:
1) $C_X$ was observed at home A and at workplace W
2) $D_Y$ was observed at home A and at the café.
3) $C_X$ and $D_Y$ co-occurred at home A
4) There are 4 places where observations were made.

The above observations are then used to calculate Association($C_X \rightarrow D_Y$) as follows:

$P(C_X) = \text{\# of occurrence } (C_X)/\text{total sample size} = (1+1)/4 = 1/2$ $P(C_X | D_Y) = \text{co-occurrences}(C_X, D_Y)/\text{occurrences}(D_Y) = 1/2$ $\text{Association}(C_X \rightarrow D_Y) = P(C_X | D_Y)/P(C_X) = (1/2)/(1/2) = 1$ The other potential pairing for $C_X$ is the pairing of $C_X$ and $D_X$. To calculate a Boolean system association score of $C_X$ and $D_X$ the following information from the table in FIG. 6 is needed:
1) $C_X$ was observed at home A and at workplace W
2) $D_X$ was observed at home A and at workplace W
3) $C_X$ and $D_X$ co-occurred at home A and at workplace W
4) There are 4 places where observations were made.

The above observations, are then used to calculate Association($C_X \rightarrow D_X$) as follows:

$P(C_X) = \text{\# of occurrence } (C_X)/\text{total sample size} = (1+1)/4 = 1/2$ $P(C_X | D_X) = \text{co-occurrences}(C_X, D_X)/\text{occurrences}(D_X) = (1+1)/(2) = 1$ $\text{Association}(C_X \rightarrow D_X) = P(C_X | D_X)/P(C_X) = (1)/(1/2) = 2$ As with the frequency count based system, when comparing the two Boolean system association scores, the higher association score may be selected. In this case, the Association($C_X \rightarrow D_X$)=2 score is higher than the Association ($C_X \rightarrow D_Y$)=1 score such that the pairing of laptop computer system ($C_X$) 251 and cellular phone ($D_X$) 252 are deemed to be a high-probability digital identity pair (not the pairing $C_X$ and $D_Y$).

Combined Frequency and Boolean Counting Score

Figure 7:
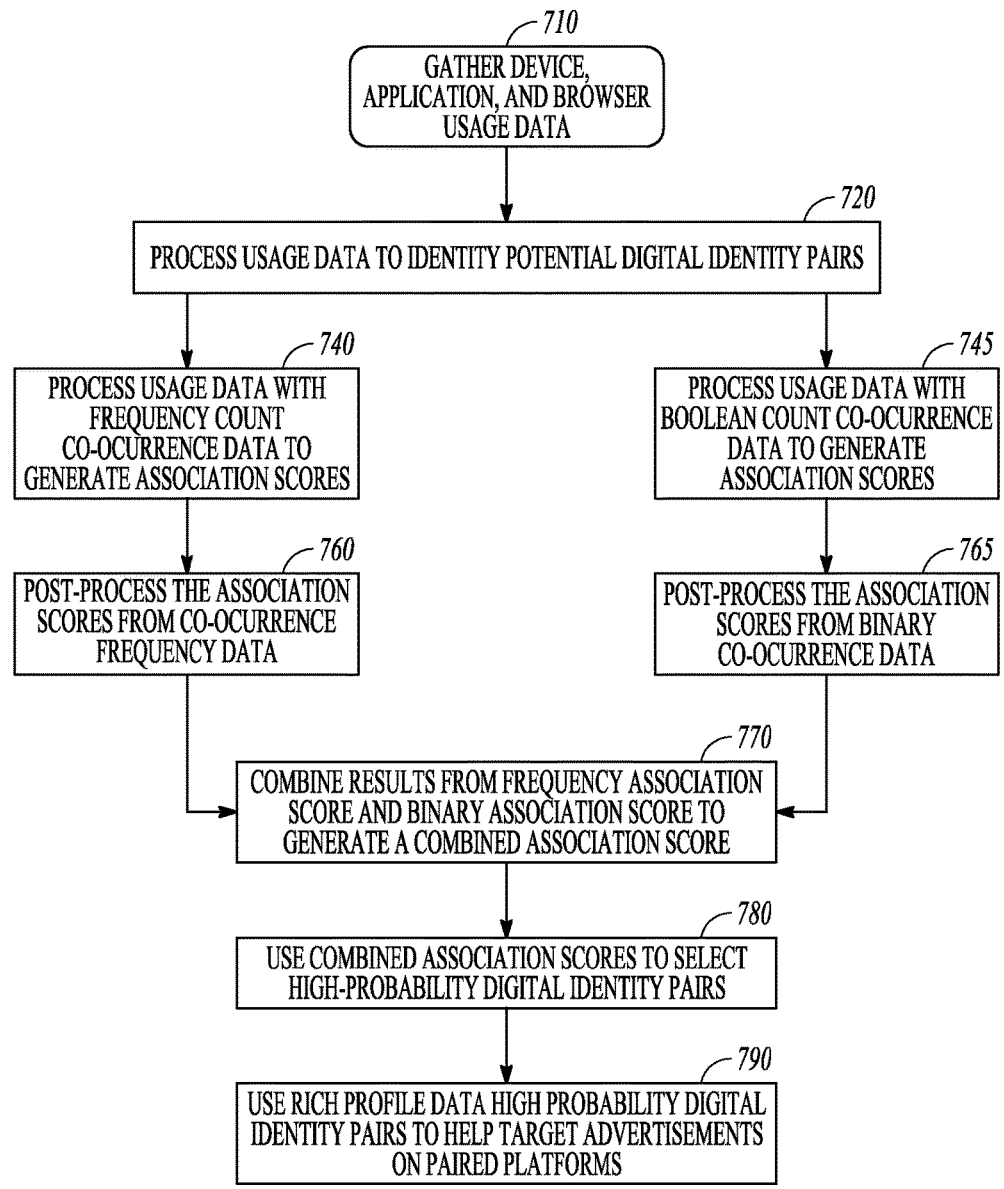
FIG. 7 illustrates a flow diagram describing how a digital pairing system may use a weighted score of frequency count association scores and Boolean system association scores to identify high-probability digital identity pairs.

Both the frequency counting system and the Boolean counting system have their own advantages. To benefit from the advantages in both approaches, some embodiments of the digital pairing system employ a weighted average of the frequency counted association score and the Boolean counted association score. FIG. 7 illustrates a flow diagram describing how such a two score based digital identity pairing system may operate. Note that although FIG. 7 and this section describes a system that uses two different score, other embodiments may consider 3, 4, or more different types of association scores.

Initially, at stage 710, the digital identity internet usage data is collected in the same manner as previously described. Next, at stage 720, the digital identity internet usage data is analyzed to select a set of potential digital identity pairings that will further be analyzed. After this point, the internet usage data is then analyzed with the two different scoring systems: a frequency counting system and a Boolean counting system.

Along a first path on the left side of FIG. 7, the digital identity internet usage data is analyzed with a frequency counting based scoring system. At stage 740, the internet usage data is processed with frequency counting to generate a first set of association scores. One possible method of implementing a frequency counting system for calculating association scores is described in the earlier "A Basic Digital Identity Pairing Method" section of this document. The frequency count based association scores may then be post-processed at stage 760 to reduce the noise in the data. The association score post-processing may performed as set forth in the earlier "Post-Processing Association Scores" section of this document.

Along the second path on the right side of FIG. 7 after stage 720, the digital identity internet usage data is analyzed with Boolean counting. At stage 745, the internet usage data is processed with Boolean counting to calculate association scores as described in the "Boolean Counting System" section of this document. Next, at stage 765, the Boolean count association scores may then be processed with the same post-processing techniques used to processing the frequency count association scores as set forth in the earlier "Post-Processing Association Scores" section of this document.

At stage 770, the processed association scores from the two different association scoring systems are then combined. Various different methods of combining the two different association scores may be used. In one embodiment, the frequency counting association scores and the Boolean counting association scores are combined in a weighted manner with the following basic equation:

$\text{Score}_{Comb} = \alpha \text{Score}_{Freq} + \beta \text{Score}_{Bool}$

Various different methods may be used to determine the best $\alpha$ and $\beta$ weighting factors that are used to combine the two different association scores. In one embodiment, class validation was used to calculate the best $\alpha$ and $\beta$ weighting factors. Specifically, digital identity usage data was collected for several pairs of digital devices where each pair of devices was known to belong to a single user. Since those pairs of digital devices were known to be actually associated with a single user, the values of the $\alpha$ and $\beta$ weighting factors were selected to maximize the combined association scores those known paired devices. Again, it must be emphasized that additional association scores may also be considered such that a weighted score may be created from several different association scores.

In some embodiments linear regression analysis may be used to determine how to combine the two association scores. Specifically, with both frequency counting association scores and the Boolean counting association scores there are two different predictors. Thus, using a set of known accurate digital identity pairings, linear regression may be used to determine how to combine the two different predictors in a manner that provides accurate results.

After creating a combined association score at stage 770, the digital pairing system may use the combined association score to select high-probability digital identity pairs at stage 780. The high-probability digital identity pairs may be selected from competing potential digital identity pairs. Finally, at stage 790, the combined profile information from the two digital identities in a digital identity pair may be used to accurately select targeted advertisements for both digital identities in the digital identity pair.

Destination Identifiers

In the preceding examples, the common source/destination identifier used was a source IP address that a digital device was using to access the internet. However, as the name implies the common source/destination identifier may identify a destination that is accessed by a particular client device. An example of the destination identifier is presented with reference to FIGS. 2B and 8.

As illustrated in FIG. 2B household A 250 has four different digital devices ($C_X$ 251, $D_X$ 252, $C_Y$ 261, and $D_Y$ 262) that access the internet 201. Since there are only four digital devices that access the internet 201 from household A 250, various combinations of these four different digital devices may be considered potential digital identity pairings. So a set of digital device usage data associated with destinations visited by these four different digital devices may be used to determine high-probability digital identity pairings.

FIG. 8 illustrates a set of destination based usage observations for the four different digital devices ($C_X$ 251, $D_X$ 252, $C_Y$ 261, and $D_Y$ 262). Specifically, FIG. 8 lists the counts of visits to the websites ESPN.com, CNN.com, Finance.com, and Fark.com for the four different digital devices ($C_X$ 251, $D_X$ 252, $C_Y$ 261, and $D_Y$ 262). The observed visits to each web site from each of the four different digital devices all occurring within a defined time period such that all the observations are current.

The same techniques disclosed in the previous sections can be used to calculate association scores for the destination addresses. Once again, the pairing of laptop computer $C_X$ 251 to one of the two cellular phones $D_X$ 252 or $D_Y$ 262 will be performed. To calculate an association score of $C_X$ and $D_Y$ the following information from the table in FIG. 4 is needed:

1) $C_X$ visited ESPN.com 5 times, Finance.com 2 times, fark.com 4 times
2) $D_Y$ visited CNN.com 9 times and Finance.com 5 times
3) $C_X$ and $D_Y$ co-occurred 2 times at Finance.com
4) There are 56 total observations The above observations are then used to calculate Association($C_X \rightarrow D_Y$) as follows:

$P(C_X)$=# of occurrence ($C_X$)/total sample size=(5+2+4))/56=11/56

$P(C_X|D_Y)$=co-occurrences($C_X, D_Y$)/occurrences($D_Y$)=2/(9+5)=1/7

Association($C_X \rightarrow D_Y$)=$P(C_X|D_Y)/P(C_X)$=(1/7)/(11/56)=0.73

The other potential digital identity pairing for laptop computer $C_X$ 251 is the pairing of $C_X$ and $D_X$. To calculate an association score for the pair of $C_X$ and $D_X$ the following information from the table in FIG. 4 is needed:

1) $C_X$ visited ESPN.com 5 times, Finance.com 2 times, fark.com 4 times
2) $D_X$ visited ESPN.com 6 times, CNN.com 2 times, fark.com 6 times
3) $C_X$ and $D_X$ co-occurred 5 times at ESPN.com and 4 times at fark.com
4) There are 56 total observations The above observations are then used to calculate Association($C_X \rightarrow D_X$) as follows:

$P(C_X)$=# of occurrence ($C_X$)/total sample size=(5+2+4))/56=11/56

$P(C_X|D_X)$=co-occurrences($C_X, D_X$)/occurrences($D_X$)=(5+4)/(16)=9/14

Association($C_X \rightarrow D_X$)=$P(C_X|D_X)/P(C_X)$=(9/14)/(11/56)=3.27

Again, the higher association score may be selected among competing digital identity pairings. In this case, the Association($C_X \rightarrow D_X$)=3.27 score is much higher than the Association($C_X \rightarrow D_Y$)=0.73 score such that the pairing of laptop computer system $C_X$ 251 and cellular phone $D_X$ 252 are deemed to be a high-probability digital identity pair. Note that the Boolean Association score may be calculated in the same manner with regard to destination identifiers.

Matching Accuracy Measurement System

User destination information can also be used to help measure the accuracy of digital identity pairings made with common source identifiers. As set forth in earlier sections of tins document, digital identity pairings may be inferred by observing which digital identities are often seen using the same source IP address. However, inaccurate pairings may occasionally occur due to random coincidences and noise in the data. For example, if two co-workers often go to lunch together such that their mobile internet devices are seen at both a workplace and a lunch place together, a digital identity pairing system may mistakenly pair those two digital devices. Thus, to further verify the accuracy of a digital identity pairing made from common source identifiers, the destination addresses frequented by the digital identities may also be examined.

Figures 9A, 9B:
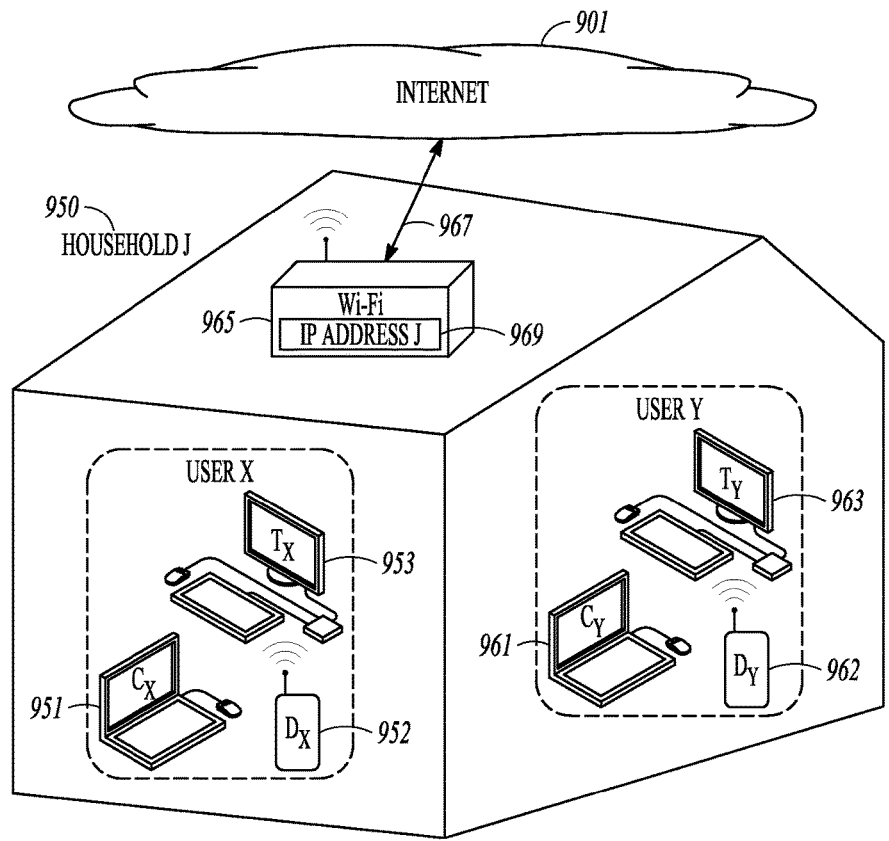
FIG. 9A conceptually illustrates a household with two users that each use desktop computer, a laptop computer, and a cellular smartphone.
FIG. 9B conceptually illustrates website usage patterns for the computers in FIG 9A and inferred website usage patterns for the cellular smartphones in FIG. 9A.

FIG. 9A illustrates a household with two users (user X and user Y) where each user owns a desktop computer, a laptop computer, and a cellular smartphone. Based upon source IP addresses, a digital pairing system has identified laptop computer $C_X$ 251 and desktop computer $T_X$ 953 as a related pair and laptop computer $C_Y$ 261 and desktop computer $T_Y$ 963 as a related pair. However, an analysis of the destination web sites accessed by those computer systems may be performed in order to ensure the accuracy of the pairings.

Given enough user history, a digital device user's visits to destination websites will show a stable pattern that can be recognized. Thus, if two paired digital identities share similar destination website visits then the pairing of the digital identities is probably accurate. However, if the two digital identities have very different destination website visits then a digital identity pairing may be discarded as inaccurate.

If two different computer systems are used by the same user then those two computer systems will generally not have identical web browsing histories since the user will not visit the exact same web pages that have already been viewed. However, the user's interests will generally be consistent such that the user will typically access web sites in the same general interest areas in the same proportions with both digital identities. Thus, if the two digital identities in a digital identity pairing visit web sites in the same general interest areas and in the same proportions that website viewing pattern is evidence supporting that the digital identity pairing is accurate. To quantify a digital identity's browsing patterns, a 'user entropy' value for digital identity may be defined as:

$$H_{ID}=\Sigma(P_i * \log P_i)$$

Where $P_i$ is the percentage of accesses to interest grouping i.

The same human user browsing on different computer systems will typically have the same level of user entropy. Thus, if two digital identities have very similar user entropy levels then this is evidence backing the assertion that the same user may be using both computer systems. To compare the user entropy values for different users, an 'entropy gain' metric may be defined as $$H_\Delta = H_{A,B} - 0.5*H_A - 0.5*H_A$$

Where $H_{A,B}=H(\text{mean}(A,B))$

Thus, to test if a digital pairing that has been made is accurate, the user entropy levels for both digital identities may be calculated and then an entropy gain may be calculated. For example, referring back to FIG. 9A, a digital pairing system has paired laptop $C_X$ 251 and desktop $T_X$ 953. User entropy values may be used to test the accuracy of this pairing. FIG. 9B illustrates a list of web browsing activities wherein laptop $C_X$ 251 browsed 40% of the time on fashion websites, 20% of the time on news website, 10% of the time on finance websites, and 30% of the time on other websites. Desktop $T_X$ 953 browsed 35% of the time on fashion, 25% of the time on news, 15% of the time on finance and 25% of the time on others. The user entropy values for laptop $C_X$ 251 and desktop $T_X$ 953 are calculated as follows:

$$H_{CX}=\Sigma(P_i * \log P_i)$$

$$H_{CX}=(0.4*\log 0.4+0.2*\log 0.2+0.1*\log 0.1+0.3*\log 0.3)=6.03$$

$$H_{TX}=(0.35*\log 0.35+0.25*\log 0.25+0.15*\log 0.15+0.25*\log 0.25)=5.72$$

The other computer systems in the household (laptop $C_Y$ 261 and desktop $T_Y$ 963) have a different browsing history and thus different user entropy values.

$$H_{CY}=(0.3*\log 0.3+0.3*\log 0.3+0.4*\log 0.4)=3.32$$

$$H_{TY}=(0.25*\log 0.25+0.35*\log 0.35+0.4*\log 0.4)=3.35$$

To calculate the entropy gain between laptop $C_X$ 251 and desktop $T_X$ 953, first the combined entropy score $H_{CX,TX}$ is calculated as follows:

$$H_{CX,TX}=(0.375*\log 0.375+0.225*\log 0.225+0.125*\log 0.125+0.275*\log 0.275)=5.84$$

Then the entropy gain is calculated with:

$$H_\Delta = H_{CX,TX} - 0.5*H_{CX} - 0.5 H_{TX}$$

$$H_\Delta = 5.84 - (0.5*6.03) - (0.5*5.72) = -0.035$$

This is a very small change in entropy thereby providing evidence that the digital pairing is correct. The same is true for the pairing of laptop $C_Y$ 261 and desktop $T_Y$ 963 where $H_{CY,TY}=3.33$ and the entropy gain is $$H_\Delta = H_{CY,TY} - 0.5*H_{CY} - 0.5*H_{TY}$$

$$H_\Delta = 3.33 - (0.5*3.32) - (0.5*3.35) = -0.01$$

In both the laptop $C_X$ 251 and desktop $T_X$ 953 pairing and the laptop $C_Y$ 261 and desktop $T_Y$ 963 pairing, the entropy gains are only slightly negative, indicating a very small decrease in user activity diversity. In general, very small negative or positive entropy gains indicate correct matching.

However, if one compares the user entropy of laptop $C_X$ 251 and laptop $C_Y$ 261, the two systems have very different user entropy levels. First, the combined entropy score $H_{CX,CY}$ is calculated as follows:

$$H_{CX,CY}=(0.2*\log 0.2+0.25*\log 0.25+0.2*\log 0.2+0.35*\log 0.35)=5.65$$

The entropy gain value is $$H_\Delta = H_{CX,CY} - 0.5*H_{CX} - 0.5*H_{CY} = 5.65 - (0.5*6.03) - (0.5*3.32) = 0.97$$

This relatively large gain in entropy indicates a significant gain in the diversity of the aggregated access pattern, thus suggesting that a pairing of laptop $C_X$ 251 and laptop $C_Y$ 261 is incorrect.

The entropy gain metric can also be used to evaluate the accuracy of matching devices across different platforms. As illustrated in FIG. 9A, both user X and user Y also have cellular phones DX 252 and $D_Y$ 262, respectively. If the cellular phones $D_X$ and $D_Y$ are smartphones with a good web browsing ability then user entropy comparisons may be performed directly with the web browsing information form the cellular phones $D_X$ 252 and $D_Y$ 262. However, many people often do not use their cellular phones for much web browsing due to the small display screen and limited user interface. Thus, there may not be enough web browsing history for a useful user entropy calculation.

Instead of analyzing the web browsing history on a cellular phone, a system may instead analyze the usage of application programs on the cellular smartphones, Apple iOS, Android, RIM Blackberry, and other cellular smartphone and tablet systems have thousands of small application programs for accomplishing a wide variety of tasks. These different application, programs can be categorized based on what features and tools the application programs provide. However, the usage of smartphone and table application programs cannot be directly compared to web browsing histories. To handle this, a large user history of web browsing and smartphone/tablet application program usage has been analyzed. There is a correlation between smartphone/table application program usage and web browsing patterns such that one can infer a likely web browsing pattern from a known smartphone/tablet application program usage history. The inferred web browsing pattern can then be used in user entropy comparisons.

For example, the user of cellular phones $D_X$ 252 is a light mobile application user that has the following application program usage pattern: 30% on casual games, 30% on life style, 20% on news, 10% on finance, and 10% on other application programs. The user of cellular phone $D_Y$ 262 has the following application program usage pattern: 50% on action games, 20% on news, 20% on finance and 10% on other apps. With a large amount of historical information web browsing and application usage on known users, a system for inferring web browsing patterns application usage patterns. For example, from the application usage pattern of cellular phone $D_X$ 252 an inference system may determine that such a user may allocate their web browsing as follows: 20% on fashion, 25% on news, 15% on finance websites, and 40% on others. In the same manner, the user of cellular phone $D_Y$ 262 may web browse 25% on news, 20% on finance. 20% on games and 35% on others.

From these inferred web browsing patterns, the user entropy metrics may be calculated. The inferred user entropy values would be:

$$H_{DIX}=(0.20*\log 0.20+0.25*\log 0.25+0.15*\log 0.15+0.4*\log 0.4)=5.81$$

$$H_{DIY}=(0.25*\log 0.25+0.20*\log 0.20+0.20*\log 0.20+ \\ 0.35*\log 0.35)=5.65$$

Assuming that laptop $C_X$ 251 and desktop $T_X$ 953 were correctly paired then one can compare the inferred web browsing history of cellular phone $D_X$ 252 with the group laptop $C_X$ 251 and desktop $T_X$ 953.

$$H_{DIX,CX,TX}=(0.2875*\log 0.2875+0.2375*\log 0.2375+ \\ 0.1375*\log 0.1375+0.3375*\log 0.3375)=5.75$$

The entropy gain may then be calculated as follows:

$$H_\Delta = H_{DIX,CX,TX} - 0.5 * H_{DIX} - 0.5 * H_{CX,TX}$$
$$= 5.75 - (0.5*5.81) - (0.5*5.84) = -0.07$$

Such a relatively small entropy gain would provide evidence supporting that the devices are used by the same user. If one attempts to match cellular phone $D_X$ 252 with laptop $C_Y$ 261 and desktop $T_Y$ 963 then the entropy gain is 1.42 ($H_{DELTA}=H_{DIX,CY,TY}-0.5*H_{DIX}-0.5*H_{CY,TY}=1.42$). Note that the web browsing inference process may not always be accurate such that higher entropy gains may appear. Thus, inference data may be better used for helping select from a set of possible matches. For example, the entropy gain of matching cellular phone $D_Y$ 262 with laptop $C_X$ 251 and desktop $T_X$ 953 is 2.64 whereas the entropy gain of matching cellular phone $D_Y$ 262 with laptop $C_Y$ 261 and desktop $T_Y$ 963 is 1.46 such that it would be better to match cellular phone $D_Y$ 262 with laptop $C_Y$ 261 and desktop $T_Y$ 963 instead of with laptop $C_X$ 251 and desktop $T_X$ 953. Thus, even with an imperfect inferred website access pattern (which is quite different from an actual recorded website pattern) the system can still determine that cellular phone $D_X$ 252 matches laptop $C_X$ 251 and desktop $T_X$ 953 better than cellular phone $D_Y$ 262; while cellular phone $D_Y$ 262 matches laptop $C_Y$ 261 and desktop $T_Y$ 963 better than cellular phone $D_X$ 252.

Occasionally, this system may encounter two different users have similar website access patterns, and the entropy gain metric will erroneously consider digital identities from the two different users to be from the same user. However, even when this mismatch occurs this mismatch will not decrease the power of targeting advertisement because these two users have the same interests.

User Session Level Sampling

In the previous sections, the source/destination identifier was the main distinguishing factor used to identify high-probability pairs. However, the timestamp can also be used to help identify digital identity pairs. Specifically, different digital devices that are often used at the same location around the same time may have a higher probability of being related to the same user. Thus, some embodiments of a digital pairing system use the timestamps in the triads of observed usage data to help calculate association scores.

Figure 10A:
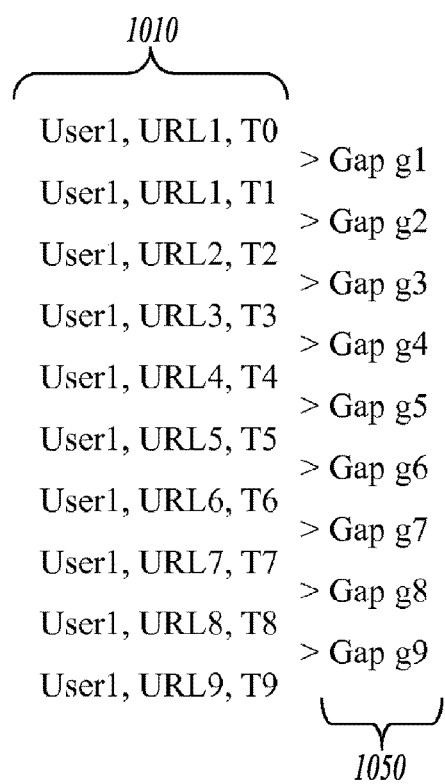
FIG. 10A illustrates a log of usage triads wherein each triad contains a client identifier, destination, and an associated timestamp.

FIG. 10A illustrate a log of usage triads 1010 wherein a client identifier of User1 has been observed visiting a series of destination identifiers (URL1 to URL9) wherein each observation has an associated timestamp (T0 to T9). To determine if different digital identities are used around the same time, the concept of a user "session" may be used. A session is defined as a set usage observations that are never more than a session threshold amount of time between successive observations. If more than a session threshold amount of time passes between two consecutive digital identity observations then those two digital identity observations are deemed to be from two separate user sessions.

Figure 11:
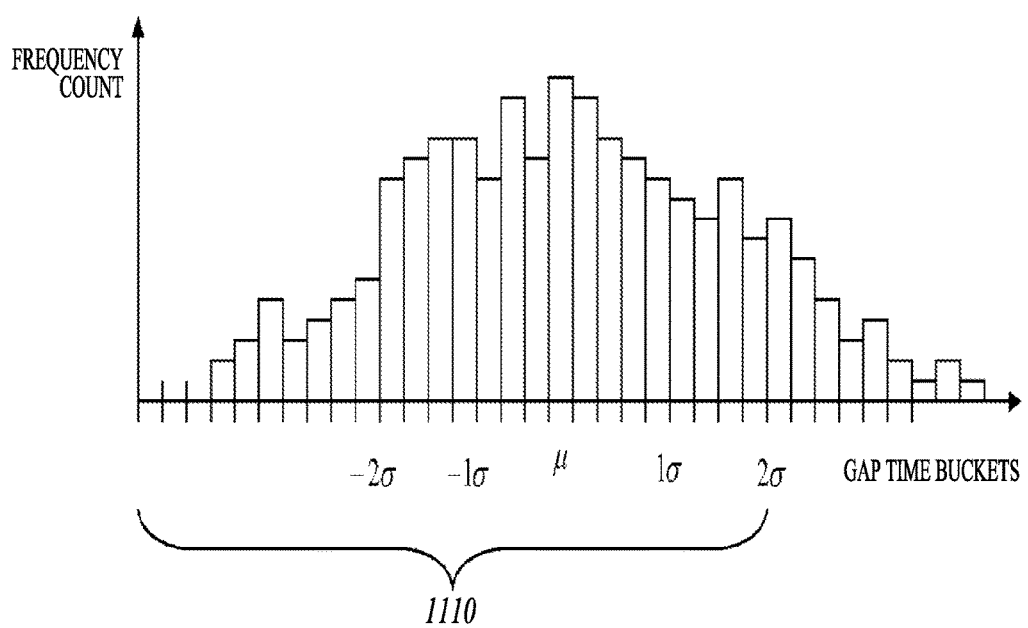

Various different methods may be used to calculate the session threshold amount of time. In one embodiment, an analysis of time gaps between digital identity usage observations is performed to calculate a session threshold amount of time. Referring to FIG. 10A, the amount of time between each digital identity observation timestamp (T0 to T9) is calculated as a gap time (g1 to g9) 1050. Once a large collection of gap times has been calculated, these gap times are then analyzed with standard normal distribution statistics analysis. Initially, all of the observed gap times are placed into gap time buckets as illustrated in FIG. 11. Then, the mean ($\mu$) and standard deviation ($\sigma$) for the gap times are calculated as illustrated in FIG. 11. Anything that is less than 2 standard deviations ($\sigma$) from the mean is considered to be within the same session. Thus, all of the gap times 1110 are deemed to be within the same user session. Note that this is just one possible embodiment and that many other methods may be used to determine what constitutes a user session. User sessions may be determined using other criteria such that user session time periods may vary in length.

After determining a method of splitting observations into temporally distinct sessions, the session data may be processed with the same association score methodology set forth in the previous sections. For example, FIG. 10B illustrates a set of sessions for the laptop computers $C_X$ 251 and $C_Y$ 261 in household A 250 of FIG. 2B. For each session, the usage observations of the four different digital devices ($C_X$ 251, $D_X$ 252, $C_Y$ 261, and $D_Y$ 262) are listed. Since the different users tend to use their laptop computers and cellular phones at different times, the two digital pairings of the two different devices may be distinguished despite only having observations from a single location (household A 250).

The techniques disclosed in the previous sections may be used to calculate association scores for the four different sessions depicted in FIG. 10B. Once again, the pairing of laptop computer $C_X$ 251 to one of the two cellular phones $D_X$ 252 or $D_Y$ 262 in household A 250 will be performed. To calculate an association score of $C_X$ and $D_Y$ the following information from the table in FIG. 10B is needed:

1) $C_X$ observations: 4 in session 1, 1 in session 3, 14 in session 4
2) $D_Y$ observations: 12 in session 2, 7 in session 3, 1 in session 4
3) $C_X$ and $D_Y$ co-occurred once in session 3 and once in session 4
4) There are 74 total observations The above Internet usage observations are then used to calculate Association ($C_X \rightarrow D_Y$) as follows:

$$P(C_X)=\text{\# occurrence } (C_X)/\text{total sample size}=(4+1+14))/74=19/74$$

$$P(C_X|D_Y)=\text{co-occurrences}(C_X, D_Y)/\text{occurrences}(D_Y) \\ =2/(12+7+1)=1/10$$

$$\text{Association}(C_X \rightarrow D_Y)=P(C_X|D_Y)/P(C_X)=(1/10)/(19/74)=0.39$$

The other potential digital identity pairing for laptop computer $C_X$ 251 is the pairing of $C_X$ and $D_X$. To calculate an association score for the pair of $C_X$ and $D_X$ following information from the table in FIG. 10B is needed:

1) $C_X$ observations: 4 in session 1, 1 in session 3, 14 in session 4
2) $D_X$ observations: 2 in session 1, 9 in session 4
3) $C_X$ and $D_X$ co-occurred twice in session 1 and 9 times in session 4
4) There are 74 total observations The above observations are then used to calculate Association($C_X \rightarrow D_X$) as follows:

$P(C_X)$=# of occurrence ($C_X$)/total sample size=(5+2+4))/56=11/56

$P(C_X|D_X)$=co-occurrences($C_X,D_X$)/occurrences($D_X$)= (2+9)/(11)=1

Association($C_X \rightarrow D_X$)=$P(C_X|D_X)/P(C_X)$=1/(11/56) =5.09

With data depicted in FIG. 10B, the Association($C_X \rightarrow D_X$) =5.09 score is much higher than the Association($C_X \rightarrow D_Y$) =0.39 score such that the pairing of laptop computer system $C_X$ 251 and cellular phone $D_X$ 252 are deemed to be a high-probability digital identity pair. Note that the Boolean Association score may be calculated in the same manner for these session-generated association scores.

Digital Identity Chaining

In the preceding sections of this document various techniques have been disclosed for identifying digital identities that are likely to belong to the same human user. When such digital identity pairs are determined, the advertising to both digital identities can be synergistically improved by combining digital profile information collected on both digital identities. However, the process does not have to end with simple pairings of digital identities. The technique can be extended to combine multiple digital identities together thereby further improving the accuracy of advertising targeting. The technique of combining together the digital profiles collected from multiple digital identities may be referred to as 'digital identity chaining'.

Referring back to FIG. 2A, household A 250 included laptop computers 251 and 261, cellular telephones 252 and 262, tablet computer system 257, and video game console 259. All of these digital electronic devices are coupled to the internet 201 and capable of receiving and displaying internet advertisements. In the preceding sections of this document, techniques disclosed how the usage patterns of the laptop computers 251 and 261 and the cellular telephones 252 and 262 could be used to identify laptop computer 251 and cellular telephone 252 as belonging to a single user X. User X may proceed to install an application onto cellular telephone 252 that is linked to a user account on video game console 259. Thus, user X may self-identify cellular telephone 252 and video game console 259 as a pair of linked identities. Since cellular telephone 252 was already linked to laptop computer 251 that means that laptop computer 251 is linked to video game console 259 by the transitive property such that digital profile information from laptop computer 251 may be used to selected targeted advertisements to video game console 259.

Digital identity chaining can synergistically improve the targeting of internet advertisements. For example, the accumulated information collected from laptop computer 251, cellular telephone 252, and video game console 259 may be used to create a very detailed digital profile of user X. This detailed digital profile of user X may then he used whenever an internet advertisement must be selected for laptop computer 251, cellular telephone 252, or video game console 259.

Note that in the above example, the cellular telephone 252 and video game console 259 were linked together using a specific application program installed onto cellular telephone 252. However, the two devices could have been pair together using the association score systems described in earlier sections. Thus, digital identity chaining may use many different methods of linking together different digital devices.

The preceding technical disclosure is intended to he illustrative, and not restrictive. For examples, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not he used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

We claim:

1. A system to deliver content, to internet-connected devices that have shared a server Internet Protocol address, based upon Internet web site server logs comprising:

a network including one or more Internet web site servers and a plurality of local Internet servers and a multiplicity of internet-connected devices, wherein individual local Internet server from among the plurality of local Internet servers is configured to act as at least one of a wireless fidelity router, a proxy server and a firewall server, and wherein each individual local Internet server from among the plurality of local Internet servers is configured to share a server Internet Protocol address with two or more of the multiplicity of internet-connected devices that connect to one or more of the Internet web site servers through said each individual local Internet server from among the plurality of local Internet servers during one or more time windows;

wherein one or more Internet web site servers are configured to record one or more logs to provide Internet usage observation triads that cross a plurality of time windows, each individual Internet usage observation triad including an internet-connected device identity, which includes at least one of a device identifier and a cookie, a server Internet Protocol address and a time stamp, each individual Internet usage observation triad indicating an occurrence of a network connection between an internet-connected device corresponding to the internet-connected device identity within the Internet usage observation triad and a server having the server Internet Protocol address within the Internet usage observation triad, at a time indicated by the time stamp within the Internet usage observation triad;

means for producing, based upon the Internet usage observation triads provided in the one or more logs recorded by the one or more Internet web site servers, different respective frequency counts, within a respective time window, of co-occurrences of different respective pairs of internet-connected device identities, wherein the internet connected device identities of the devices of respective pairs occur within different Internet usage observation triads that share matching Internet Protocol addresses;

means for producing, based upon the Internet usage observation triads provided in the one or more logs recorded by the one or more Internet web site servers, different respective Boolean counts, within a respective time window, of Internet protocol addresses having co-occurrences of different respective pairs of internet-connected device identities, wherein the internet connected device identities of the devices of respective pairs occur within different Internet usage observation triads that share matching Internet Protocol addresses;

means for determining a device pairing of first and second internet-connected devices that have shared a server Internet Protocol address of at least one of the plurality of local Internet servers during the one or more time windows, based at least in part upon totals of the frequency counts of co-occurrences of the respective pairs of digital identities with each of the multiple respective Internet Protocol addresses within the one or more time windows and upon Boolean counts of Internet protocol addresses having co-occurrences of the respective pairs of digital identities with each of the multiple respective Internet Protocol addresses within the one or more time windows;

at least one Internet web site server included in the network configured based upon the determined pairing of the first and second internet-connected devices,
to select content in response to one of the determined paired first and second internet-connected devices and that is currently browsing or using an application, based upon a profile of another of the one of the determined paired first and second internet-connected devices, and
to send the selected content to the one of the determined paired first and second internet-connected devices that is included in the network and that is currently browsing or using an application.

* * * * *

UNITED STATES PATENT AND TRADEMARK OFFICE
CERTIFICATE OF CORRECTION

Page 1 of 1

PATENT NO. : 10,248,968 B2
APPLICATION NO. : 14/992893
DATED : April 2, 2019
INVENTOR(S) : Sivaramakrishnan et al.

It is certified that error appears in the above-identified patent and that said Letters Patent is hereby corrected as shown below:

On the Title Page

In Column 2, under "Other Publications", Line 1, delete "Boundaires" and insert --Boundaries-- therefor In item (57), in "Abstract", in Column 2, Line 7, delete "identities:" and insert --identities;-- therefor Signed and Sealed this
Seventeenth Day of March, 2020

Andrei Iancu
*Director of the United States Patent and Trademark Office*